(12) United States Patent
Heitz, III et al.

(10) Patent No.: US 11,483,451 B2
(45) Date of Patent: Oct. 25, 2022

(54) METHODS AND SYSTEMS FOR COLORIZING INFRARED IMAGES

(71) Applicant: Google LLC, Mountain View, CA (US)

(72) Inventors: George Alban Heitz, III, Mountain View, CA (US); Rizwan Ahmed Chaudhry, Palo Alto, CA (US); Ankit Mohan, Mountain View, CA (US); Joshua Fromm, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/297,362

(22) PCT Filed: Nov. 19, 2019

(86) PCT No.: PCT/US2019/062187
§ 371 (c)(1),
(2) Date: May 26, 2021

(87) PCT Pub. No.: WO2020/112442
PCT Pub. Date: Jun. 4, 2020

(65) Prior Publication Data
US 2021/0400167 A1 Dec. 23, 2021

Related U.S. Application Data

(60) Provisional application No. 62/771,944, filed on Nov. 27, 2018.

(51) Int. Cl.
*H04N 1/46* (2006.01)
*G06T 5/00* (2006.01)
*H04N 5/33* (2006.01)

(52) U.S. Cl.
CPC .............. *H04N 1/465* (2013.01); *G06T 5/005* (2013.01); *H04N 5/332* (2013.01); *G06T 2207/10016* (2013.01); *G06T 2207/10048* (2013.01)

(58) Field of Classification Search
CPC . G06T 2207/10016; G06T 2207/10048; G06T 5/005; H04N 1/465; H04N 5/332
(Continued)

(56) References Cited

U.S. PATENT DOCUMENTS

2008/0283729 A1\* 11/2008 Hosaka .............. H04N 9/04559
250/208.1
2015/0358560 A1\* 12/2015 Boulanger ........... H04N 5/3658
348/164
(Continued)

FOREIGN PATENT DOCUMENTS

CN 106600572 A 4/2017
CN 108846822 A 11/2018

OTHER PUBLICATIONS

International Search Report and Written Opinion of International Application No. PCT/US2019/062187, dated Mar. 9, 2020, 9 pp.
(Continued)

*Primary Examiner* — James T Boylan
(74) *Attorney, Agent, or Firm* — Colby Nipper PLLC

(57) ABSTRACT

A method is performed at a system that comprises one or more video cameras and a remote server system. The method includes obtaining, via a video camera of the one or more video cameras, a continuous stream of video data for a scene. The video data stream comprises color video data in accordance with a determination that the scene has illumination above an illumination threshold and comprises infrared (IR) video data in accordance with a determination that the scene does not have illumination above the illumination threshold. The method includes colorizing the IR video data
(Continued)

based on a subset of the color video data. The method further includes presenting the colorized video data to a user in real time.

20 Claims, 18 Drawing Sheets

(58) Field of Classification Search
USPC .......................................................... 348/164
See application file for complete search history.

(56) References Cited

U.S. PATENT DOCUMENTS

| | | | |
|---|---|---|---|
| 2016/0155245 A1* | 6/2016 | Stauder | G06T 11/001 |
| | | | 382/167 |
| 2018/0097972 A1* | 4/2018 | Bourret | G06K 9/6267 |
| 2018/0176514 A1* | 6/2018 | Kirmani | G06K 9/52 |
| 2018/0225522 A1* | 8/2018 | Herrero Molina | |
| | | | G06K 9/00771 |
| 2019/0156485 A1* | 5/2019 | Pfeiffer | G06V 20/56 |
| 2019/0361994 A1* | 11/2019 | Shen | G06N 3/08 |
| 2020/0242355 A1* | 7/2020 | Kim | G06K 9/6256 |

OTHER PUBLICATIONS

International Preliminary Report on Patentability from International Application No. PCT/US2019/062187, dated May 25, 2021, 8 pp.

\* cited by examiner

METHODS AND SYSTEMS FOR COLORIZING INFRARED IMAGES

TECHNICAL FIELD

This relates generally to colorizing images, including but not limited to, colorizing infrared video from a home camera device.

BACKGROUND

Infrared imaging is useful in low light situations where there is insufficient lighting for visible spectrum imaging. Infrared illuminators used in conjunction with a video camera have advantages over visible illuminators in some circumstances. However, since infrared light is not part of the visible spectrum, colors are not present in infrared images.

SUMMARY

Accordingly, there is a need for systems and/or devices with methods for colorizing infrared images. Such systems, devices, and methods optionally complement or replace conventional systems, devices, and methods for colorizing images.

Some cameras use infrared (IR) illumination to capture night-vision video when ambient light level is low. This allows the camera's user to see in the dark, but the images captured are monochromatic. Colorizing the monochromatic IR images is challenging. For example, unlike with grey-scale images, IR light intensity variations within the captured scene lead to shading variations in the monochromatic image that are color-independent. Also, the light sources and shadows in low-light IR images (e.g., nighttime images) may be very different from the analogous lit images (e.g., day-time images). Illumination supplied by the sun or by visible light fixtures may be in very different orientations than the illumination supplied by the IR illuminators used for the IR images. The presently disclosed methods, devices, and systems provide solutions to these technical challenges.

In accordance with some implementations, a computer system utilizes convolutional colorization techniques to colorize IR images. In some implementations, the system stores color images (e.g., in an RGB color space) of the environment. In some implementations, the stored images are used to gain information about the colors of scene. Incorporating this prior color information into the architecture of the network allows more accurately colorized images to be generated. In some implementations, the distribution of color values from the RGB images is obtained and the generated colors are rescaled to better fit that distribution. The colorization techniques disclosed herein may be applied to any situation that requires realistic IR colorization, or to other similar image-to-image translation domains. One of the key aspects of this disclosure is the use of prior image samples to inform colorization.

In one aspect, some implementations include a method performed at a system (e.g., a home system) that includes one or more video cameras and a remote server system. In some implementations, the method includes: (1) obtaining, via a video camera of the one or more video cameras, a continuous stream of video data for a scene, where the video data stream includes: (a) color video data in accordance with a determination that the scene has illumination above an illumination threshold; and (b) infrared (IR) video data in accordance with a determination that the scene does not have illumination above the illumination threshold; (2) colorizing the IR video data based on a subset of the color video data; and (3) presenting the colorized video data to a user in real time.

In another aspect, some implementations include a method performed at a computing system (e.g., a home system) that includes one or more processors and memory. In some implementations, the method includes: (1) obtaining infrared (IR) video data corresponding to a scene illuminated with IR light, the scene in a field of view of a camera linked to a user account of the computing system; (2) colorizing the IR video data; and (3) presenting the colorized video data to a user in real time.

In another aspect, some implementations include a method performed at a computing system that includes one or more processors and memory. The method includes: (1) receiving a request from a user to generate a video clip from infrared (IR) video data; (2) receiving a lighting preference from the user; (3) obtaining the IR video; (4) generating the video clip, including colorizing the IR video data in accordance with the lighting preference; and (5) presenting the colorized video clip to the user.

In some implementations, a camera device is configured to perform any of the methods described herein. In some implementations, a computing system is configured to perform any of the methods described herein. In some implementations, a non-transitory computer-readable storage medium includes instructions to perform any of the methods described herein.

Thus, systems and devices are provided with more accurate and effective methods for colorizing infrared images, thereby increasing the accuracy, effectiveness, efficiency, and user satisfaction with such devices. Such systems, devices, and methods may complement or replace conventional systems and methods for colorizing images.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DETAILED DESCRIPTION

In many situations, it is desirable to capture images of a scene while visible light levels are low. For example, to provide proper security, smart home and security cameras should be able to monitor an area at night and in other low-light situations. Infrared (IR) systems can be used (e.g., in combination with IR illuminators) to monitor scenes where visible light is insufficient. However, IR images are monochromatic, meaning less information is conveyed to the user(s) of the system. Colorizing the images, e.g., based on prior color images of the same scene or objects, provides the user(s) with more information and enables them to take more informed action (e.g., in response to events involving the scene).

Colorizing IR images poses unique challenges. For example, variations in illumination levels lead to color-independent variations in the monochromatic IR images that need to be addressed. As another example, differences in orientation of the IR light sources in the low-light images of the scene and the visible light sources (e.g., sources that include wavelengths of light that a human eye can detect, such as the sun and/or light from electrical sources) in the lit images of the scene may lead to very different shadows and shading between low-light and lit images that can cause confusion with user(s) if not addressed.

Figure 1:
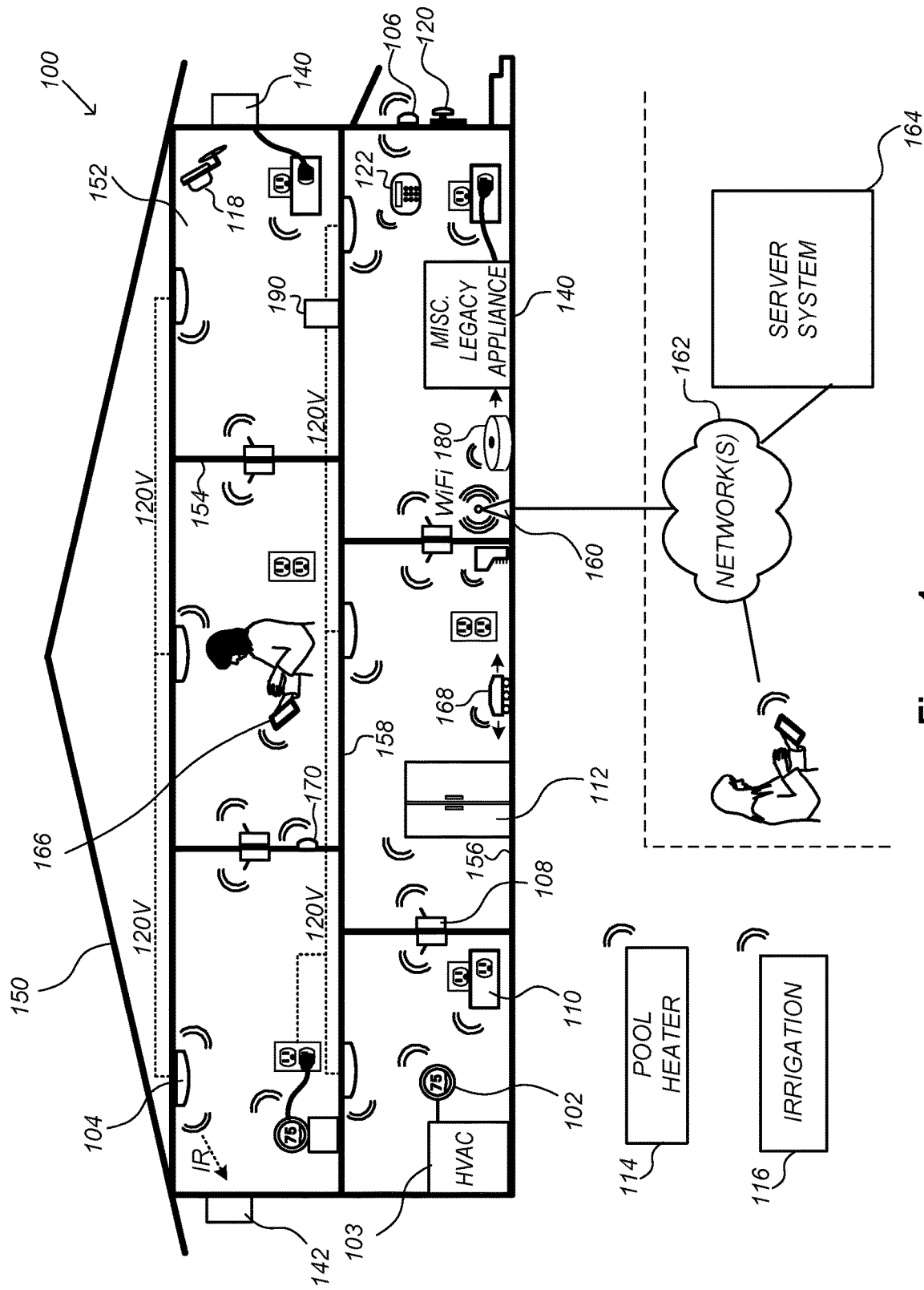
FIG. 1 is an example home environment in accordance with some implementations.

Turning now to the figures, FIG. 1 is an example home environment 100 in accordance with some implementations. The home environment 100 includes a structure 150 (e.g., a house, office building, garage, or mobile home) with various integrated devices (also referred to herein as "home devices," "connected devices," "electronic devices" or "smart devices"). It will be appreciated that devices may also be integrated into a home environment 100 that does not include an entire structure 150, such as an apartment, condominium, or office space. Further, the home environment 100 may control and/or be coupled to devices outside of the actual structure 150. Indeed, several devices in the home environment 100 need not be physically within the structure 150. For example, a device controlling a pool heater 114 or irrigation system 116 may be located outside of the structure 150.

It is to be appreciated that "home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, yards, parks, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the home environment 100 include intelligent, multi-sensing, network-connected devices that integrate seamlessly with each other in a home network (e.g., 202 FIG. 2A) and/or with a central server or a cloud-computing system to provide a variety of useful smart home functions. The home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding black-body radiation data as output.

The smart doorbell 106 and/or the smart door lock 120 detects a person's approach to or departure from a location (e.g., an outer door), control doorbell/door locking functionality (e.g., receive user inputs from a portable electronic device 166 to actuate bolt of the smart door lock 120), announce a person's approach or departure via audio or visual means, and/or control settings on a security system (e.g., to activate or deactivate the security system when occupants go and come). In some implementations, the smart doorbell 106 and/or the smart lock 120 are battery-powered (e.g., are not line-powered). In some implementations, the smart doorbell 106 includes some or all of the components and features of the camera 118. In some implementations, the smart doorbell 106 includes a camera 118. In some implementations, the smart doorbell 106 includes a camera 118 that is embedded in the doorbell 106. In some implementations, the smart doorbell 106 includes a camera that is mounted on or near the doorbell 106. In some implementations, the smart doorbell 106 includes a camera 118 that is not mounted in, on, or near the doorbell 106, but is instead mounted in proximity to the doorbell 106. In some implementations, the smart doorbell 106 includes two or more cameras 118 (e.g., one camera facing the entryway, and another camera facing approaching visitors). In some implementations, the smart doorbell 106 has a camera (also sometimes referred to herein as doorbell camera 106) which is separate from a video camera 118. For the purposes of this disclosure, video-related references to doorbell 106 refer to one or more cameras associated with doorbell 106.

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 detect ambient lighting conditions, detect room-occupancy states, and/or control a power and/or dim state of one or more lights. In some instances, smart wall switches 108 also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the home environment 100 includes one or more network-connected cameras 118 that are configured to provide video monitoring and security in the home environment 100. In some implementations, the cameras 118 are battery-powered (e.g., are not line-powered). In some implementations, as described in more detail below, the cameras 118 are configured to selectively couple to one or more networks and/or selectively capture, store, transmit video data (e.g., based on presence and characterization of motion within the field of view). In some implementations, in the low power mode, a camera 118 detects an approaching visitor using a low power sensor, such as a PIR sensor, which is always on or periodically on.

In some implementations, the cameras 118 are used to determine occupancy of the structure 150 and/or particular rooms 152 in the structure 150, and thus act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio). In some implementations, the cameras 118 are each configured to operate in a day mode and in a low-light mode (e.g., a night mode). In some implementations, the cameras 118 each include one or more IR illuminators for providing illumination while the camera is operating in the low-light mode. In some implementations, the cameras 118 include one or more outdoor cameras. In some implementations, the outdoor cameras include additional features and/or components such as weatherproofing and/or solar ray compensation.

In some implementations, the home environment 100 includes one or more network-connected doorbells 106 that are configured to provide video monitoring and security in a vicinity of an entryway of the home environment 100. The doorbells 106 are optionally used to determine the approach and/or presence of a visitor. Specific individuals are optionally identified based, for example, on their appearance (e.g., height, face) and/or movement (e.g., their walk/gait). A doorbell 106 optionally includes one or more sensors (e.g., IR sensors, motion detectors), input devices (e.g., microphone for capturing audio), and output devices (e.g., speaker for outputting audio). In some implementations, a doorbell 106 is configured to operate in a high-light mode (e.g., a day mode) and in a low-light mode (e.g., a night mode). In some implementations, a doorbell 106 includes one or more IR illuminators for providing illumination while the camera is operating in the low-light mode. In some implementations, a doorbell 106 includes one or more lights (e.g., one or more LEDs) for illuminating the doorbell in low-light conditions and/or giving visual feedback to a visitor. In some implementations, a doorbell 106 includes additional features and/or components such as weatherproofing and/or solar ray compensation. In some implementations, doorbell 106 is battery powered and runs in a low power or a high power mode. In some implementations, in the low power mode, doorbell 106 detects an approaching visitor using a low power sensor such as a PIR sensor which is always on or periodically on. In some implementations, after the visitor approach is detected, doorbell 106 switches to the high power mode to carry out further processing functions (described below).

In some implementations, the home environment 100 additionally or alternatively includes one or more other occupancy sensors (e.g., the smart doorbell 106, smart door locks 120, touch screens, IR sensors, microphones, ambient light sensors, motion detectors, smart nightlights 170, etc.). In some implementations, the home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

In some implementations, the home environment 100 includes one or more devices outside of the physical home but within a proximate geographical range of the home. For example, the home environment 100 may include a pool heater monitor 114 that communicates a current pool temperature to other devices within the home environment 100 and/or receives commands for controlling the pool temperature. Similarly, the home environment 100 may include an irrigation monitor 116 that communicates information regarding irrigation systems within the home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control electronic devices in the home environment 100 using a network-connected computer or portable electronic device 166. In some examples, some or all of the occupants (e.g., individuals who live in the home) may register their device 166 with the home environment 100. Such registration may be made at a central server to authenticate the occupant and/or the device as being associated with the home and to give permission to the occupant to use the device to control the electronic devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, the devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a server system 164 (also called a central server system and/or a cloud-computing system herein). The server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the server system 164 to smart devices (e.g., when available, when purchased, or at routine intervals).

In some implementations, the network interface 160 includes a conventional network device (e.g., a router), and the home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the home environment 100). Each of these smart devices optionally communicates with the hub device 180 using one or more radio communication networks available at least in the home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device. In some implementations, hub device 180 further comprises a local storage device for storing data related to, or output by, smart devices of home environment 100. In some implementations, the data includes one or more of: video data output by a camera device, metadata output by a smart device, settings information for a smart device, usage logs for a smart device, and the like.

In some implementations, home environment 100 includes a local storage device 190 for storing data related to, or output by, smart devices of home environment 100. In some implementations, the data includes one or more of: video data output by a camera device (e.g., a camera included with doorbell 106), metadata output by a smart device, settings information for a smart device, usage logs for a smart device, and the like. In some implementations, local storage device 190 is communicatively coupled to one or more smart devices via a home network (e.g., home network 202, FIG. 2A). In some implementations, local storage device 190 is selectively coupled to one or more smart devices via a wired and/or wireless communication network. In some implementations, local storage device 190 is used to store video data when external network conditions are poor. For example, local storage device 190 is used when an encoding bitrate of the camera included with doorbell 106 exceeds the available bandwidth of the external network (e.g., network(s) 162). In some implementations, local storage device 190 temporarily stores video data from one or more doorbells (e.g., doorbell 106) prior to transferring the video data to a server system (e.g., server system 164).

Figure 2A:
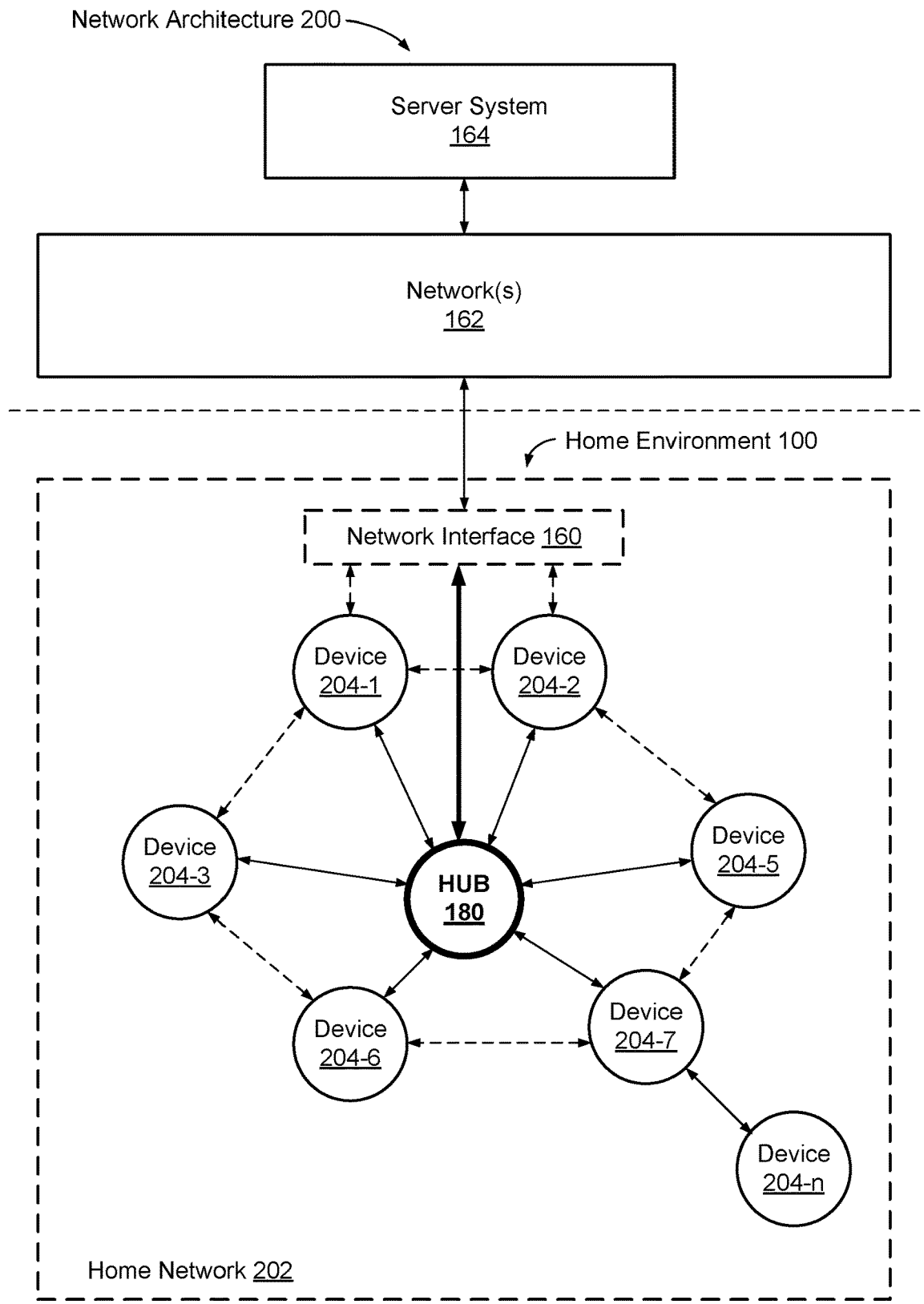
FIG. 2A is a block diagram illustrating a representative network architecture that includes a home network in accordance with some implementations.

FIG. 2A is a block diagram illustrating a representative network architecture 200 that includes a home network 202 in accordance with some implementations. In some implementations, the electronic devices 204 in the home environment 100 (e.g., devices 102, 104, 106, 108, 110, 112, 114, 116, 118, 120, and/or 122) combine with the hub device 180 to create a mesh network in home network 202. In some implementations, one or more electronic devices 204 in the home network 202 operate as a home controller. Additionally and/or alternatively, the hub device 180 operates as the home controller. In some implementations, a home controller has more computing power than other smart devices. In some implementations, a home controller processes inputs (e.g., from electronic devices 204, electronic device 166, and/or server system 164) and sends commands (e.g., to electronic devices 204 in the home network 202) to control operation of the home environment 100. In some implementations, some of the electronic devices 204 in the home network 202 (e.g., in the mesh network) are "spokesman" nodes (e.g., 204-1) and others are "low-powered" nodes (e.g., 204-9). Some of the electronic devices in the home environment 100 are battery powered, while others have a regular and reliable power source, such as by connecting to wiring (e.g., to 120 Volt line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the home environment 100, as well as with the server system 164. In some implementations, one or more "spokesman" nodes operate as a home controller. On the other hand, the devices that are battery powered are the "low-power" nodes. These nodes tend to be smaller than spokesman nodes and typically only communicate using wireless protocols that require very little power, such as Zigbee, ZWave, 6LoWPAN, Thread, Bluetooth, etc.

In some implementations, some low-power nodes are incapable of bidirectional communication. These low-power nodes send messages, but they are unable to "listen". Thus, other devices in the home environment 100, such as the spokesman nodes, cannot send information to these low-power nodes. In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the server system 164 (using, e.g., the relatively high-power communication protocol). Thus, the low-powered nodes using low-power communication protocols are able to send and/or receive messages across the entire smart home network 202, as well as over the Internet 162 to the server system 164. In some implementations, the mesh network enables the server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the server system 164 may communicate control commands to the low-powered nodes. For example, a user may use the electronic device 166 (e.g., a smart phone) to send commands over the Internet to the server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the server system 164.

In some implementations, a smart nightlight 170 (FIG. 1), which is an example of an electronic device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the server system 164.

Other examples of low-power nodes include battery-powered versions of the smart hazard detectors 104, cameras 118, doorbells 106, and the like. These battery-powered smart devices are often located in an area without access to constant and reliable power and optionally include any number and type of sensors, such as image sensor(s), occupancy/motion sensors, ambient light sensors, ambient temperature sensors, humidity sensors, smoke/fire/heat sensors (e.g., thermal radiation sensors), carbon monoxide/dioxide sensors, and the like. Furthermore, battery-powered smart devices may send messages that correspond to each of the respective sensors to the other devices and/or the server system 164, such as by using the mesh network as described above.

Examples of spokesman nodes include line-powered smart doorbells 106, smart thermostats 102, smart wall switches 108, and smart wall plugs 110. These devices are located near, and connected to, a reliable power source, and therefore may include more power-consuming components, such as one or more communication chips capable of bidirectional communication in a variety of protocols.

In some implementations, the home environment 100 includes service robots 168 (FIG. 1) that are configured to carry out, in an autonomous manner, any of a variety of household tasks.

As explained above with reference to FIG. 1, in some implementations, the home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 2B:
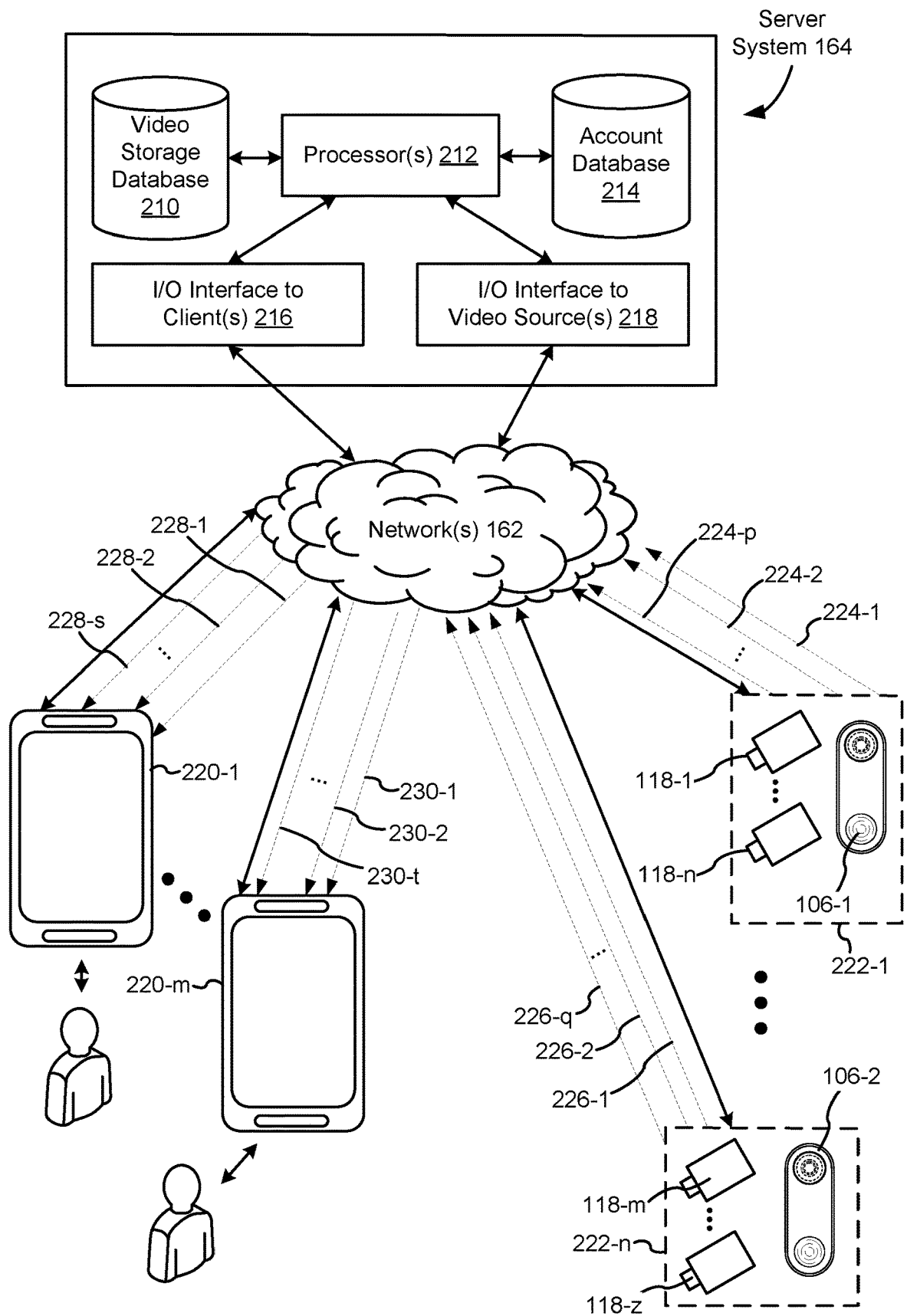
FIG. 2B is a representative operating environment in which a server system interacts with client devices and electronic devices in accordance with some implementations.

FIG. 2B illustrates a representative operating environment in which a server system 164 provides data processing for monitoring and facilitating review of events (e.g., motion, audio, security, etc.) from data captured by the electronic devices 204, such as video cameras 118 or doorbell cameras 106. As shown in FIG. 2B, the server system 164 receives data from video sources 222 (including cameras 118 and/or doorbell cameras 106) located at various physical locations (e.g., inside or in proximity to homes, restaurants, stores, streets, parking lots, and/or the home environments 100 of FIG. 1). In some implementations, the video source(s) 222 are linked to more than one reviewer account (e.g., multiple user accounts may be subscribed to a single smart home environment). In some implementations, the server system 164 provides video monitoring data for the video source 222 to client devices 220 associated with the reviewer accounts. For example, the portable electronic device 166 is an example of the client device 220. In some implementations, the server system 164 comprises a video processing server that provides video processing services to the video sources and client devices 220. In some implementations, the server system 164 receives non-video data from one or more smart devices 204 (e.g., audio data, metadata, numerical data, etc.). In some implementations, the non-video data is analyzed to provide context for motion events detected by the video cameras 118 and/or doorbell cameras 106. In some implementations, the non-video data indicates that an audio event (e.g., detected by an audio device), security event (e.g., detected by a perimeter monitoring device), hazard event (e.g., detected by a hazard detector), medical event (e.g., detected by a health-monitoring device), or the like has occurred within a home environment 100.

In some implementations, a multiple reviewer accounts are linked to a single home environment 100. For example, multiple occupants of a home environment 100 may have accounts liked to the smart home environment. In some implementations, each reviewer account is associated with a particular level of access. In some implementations, each reviewer account has personalized notification settings. In some implementations, a single reviewer account is linked to multiple home environments 100. For example, a person may own or occupy, or be assigned to review and/or govern, multiple home environments 100. In some implementations, the reviewer account has distinct levels of access and/or notification settings for each smart home environment.

In some implementations, each of the video sources 222 includes one or more video cameras 118 or doorbell cameras 106 that capture video and send the captured video to the server system 164 substantially in real-time. In some implementations, each of the video sources 222 includes one or more doorbell cameras 106 that capture video and send the captured video to the server system 164 in real-time (e.g., within 1 second, 10 seconds, 30 seconds, or 1 minute). In some implementations, each of the doorbells 106 include a video camera that captures video and sends the captured video to the server system 164 in real-time. In some implementations, a video source 222 includes a controller device (not shown) that serves as an intermediary between the one or more doorbells 106 and the server system 164. The controller device receives the video data from the one or more doorbells 106, optionally performs some preliminary processing on the video data, and sends the video data and/or the results of the preliminary processing to the server system 164 on behalf of the one or more doorbells 106 (e.g., in real-time). In some implementations, each camera has its own on-board processing capabilities to perform some preliminary processing on the captured video data before sending the video data (e.g., along with metadata obtained through the preliminary processing) to the controller device and/or the server system 164. In some implementations, one or more of the cameras is configured to optionally locally store the video data (e.g., for later transmission if requested by a user). In some implementations, a camera is configured to perform some processing of the captured video data, and, based on the processing, either send the video data in substantially real-time, store the video data locally, or disregard the video data.

Figure 6:
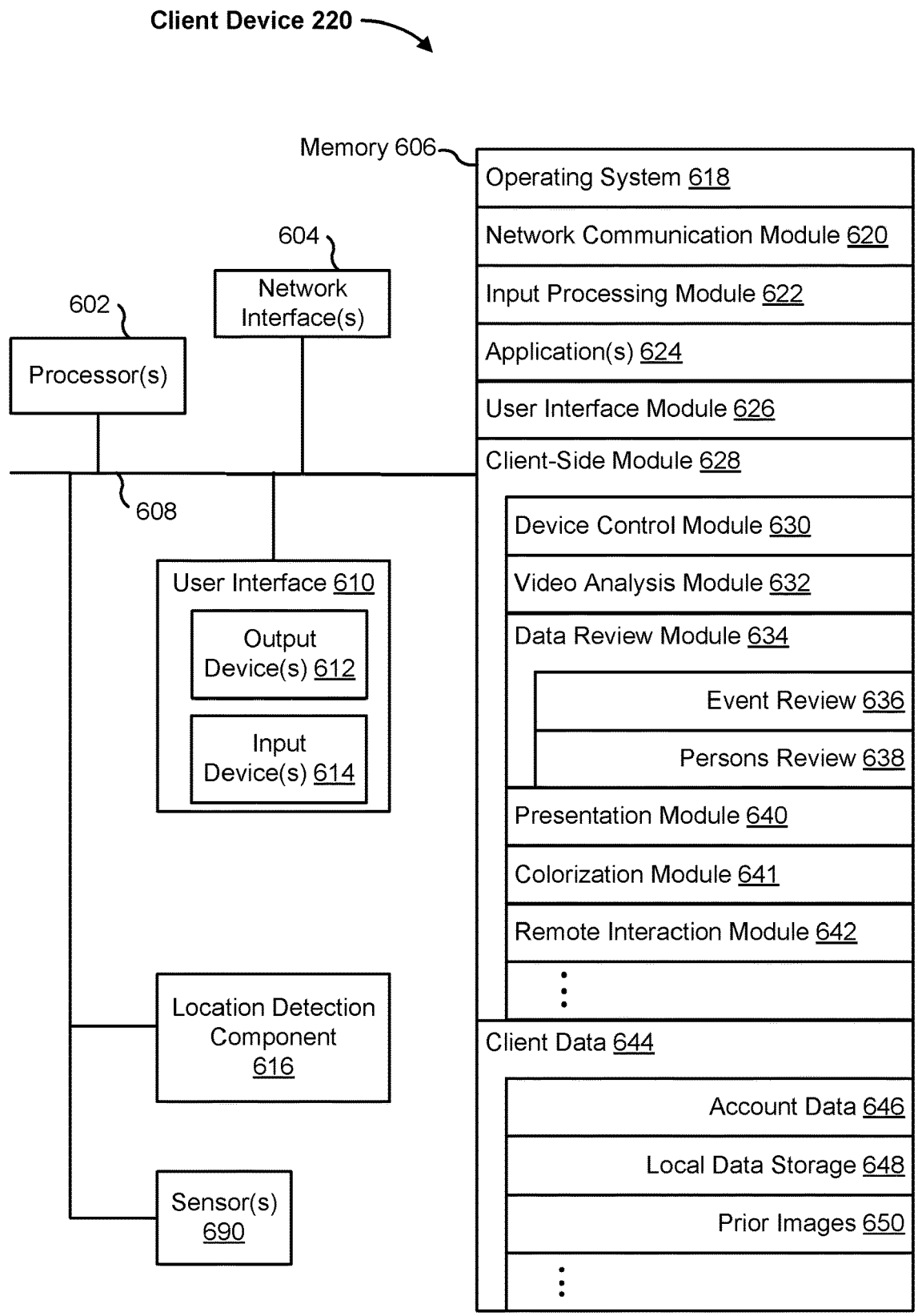
FIG. 6 is a block diagram illustrating a representative client device in accordance with some implementations.

In accordance with some implementations, a client device 220 includes a client-side module or smart home application, such as client-side module 628 in FIG. 6. In some implementations, the client-side module communicates with a server-side module executed on the server system 164 through the one or more networks 162. The client-side module provides client-side functionality for the event monitoring and review processing and communications with the server-side module. The server-side module provides server-side functionality for event monitoring and review processing for any number of client-side modules each residing on a respective client device 220. In some implementations, the server-side module also provides server-side functionality for video processing and camera control for any number of the video sources 222, including any number of control devices, cameras 118, and doorbells 106.

In some implementations, the server system 164 includes one or more processors 212, a video storage database 210, an account database 214, an I/O interface to one or more client devices 216, and an I/O interface to one or more video sources 218. The I/O interface to one or more clients 216 facilitates the client-facing input and output processing. The account database 214 stores a plurality of profiles for reviewer accounts registered with the video processing server, where a respective user profile includes account credentials for a respective reviewer account, and one or more video sources linked to the respective reviewer account. The I/O interface to one or more video sources 218 facilitates communications with one or more video sources 222 (e.g., groups of one or more doorbells 106, cameras 118, and associated controller devices). The video storage database 210 stores raw video data received from the video sources 222, as well as various types of metadata, such as motion events, event categories, event category models, event filters, and event masks, for use in data processing for event monitoring and review for each reviewer account.

Examples of a representative client device 220 include a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 164 is implemented on one or more standalone data processing apparatuses or a distributed network of computers. In some implementations, the server system 164 also employs various virtual devices and/or services of third party service providers (e.g., third-party cloud service providers) to provide the underlying computing resources and/or infrastructure resources of the server system 164. In some implementations, the server system 164 includes, but is not limited to, a server computer, a cloud server, a distributed cloud computing system, a handheld computer, a tablet computer, a laptop computer, a desktop computer, or a combination of any two or more of these data processing devices or other data processing devices.

In some implementations, a server-client environment includes both a client-side portion (e.g., the client-side module) and a server-side portion (e.g., the server-side module). The division of functionality between the client and server portions of operating environment can vary in different implementations. Similarly, the division of functionality between a video source 222 and the server system 164 can vary in different implementations. For example, in some implementations, the client-side module is a thin-client that provides only user-facing input and output processing functions, and delegates all other data processing functionality to a backend server (e.g., the server system 164). Similarly, in some implementations, a respective one of the video sources 222 is a simple video capturing device that continuously captures and streams video data to the server system 164 with limited or no local preliminary processing on the video data. Although many aspects of the present technology are described from the perspective of the server system 164, the corresponding actions performed by a client device 220 and/or the video sources 222 would be apparent to one of skill in the art. Similarly, some aspects of the present technology may be described from the perspective of a client device or a video source, and the corresponding actions performed by the video server would be apparent to one of skill in the art. Furthermore, some aspects may be performed by the server system 164, a client device 220, and a video source 222 cooperatively.

In some implementations, a video source 222 (e.g., a camera 118 or doorbell 106 having an image sensor) transmits one or more streams of video data to the server system 164. In some implementations, the one or more streams include multiple streams, of respective resolutions and/or frame rates, of the raw video captured by the image sensor. In some implementations, the multiple streams include a "primary" stream (e.g., 226-1) with a certain resolution and frame rate (e.g., corresponding to the raw video captured by the image sensor), and one or more additional streams (e.g., 226-2 through 226-$q$). An additional stream is optionally the same video stream as the "primary" stream but at a different resolution and/or frame rate, or a stream that captures a portion of the "primary" stream (e.g., cropped to include a portion of the field of view or pixels of the primary stream) at the same or different resolution and/or frame rate as the "primary" stream. In some implementations, the primary stream and/or the additional streams are dynamically encoded (e.g., based on network conditions, server operating conditions, camera operating conditions, characterization of data in the stream (e.g., whether motion is present), user preferences, and the like.

In some implementations, one or more of the streams 226 is sent from the video source 222 directly to a client device 220 (e.g., without being routed to, or processed by, the server system 164). In some implementations, one or more of the streams is stored at the doorbell 106 (e.g., in memory 406, FIG. 4) and/or a local storage device 190 (e.g., a dedicated recording device), such as a digital video recorder (DVR). For example, in accordance with some implementations, the doorbell 106 stores the most recent 24 hours of video footage recorded by the camera. As another example, in accordance with some implementations, the doorbell 106 stores up to 24 hours of video footage recorded by the camera (e.g., up to 24 hours of motion event data). In some implementations, portions of the one or more streams are stored at the doorbell 106 and/or the local storage device 109 (e.g., portions corresponding to particular events or times of interest).

In some implementations, the server system 164 transmits one or more streams of video data to a client device 220 to facilitate event monitoring by a user. In some implementations, the one or more streams may include multiple streams, of respective resolutions and/or frame rates, of the same video feed. In some implementations, the multiple streams include a "primary" stream with a certain resolution and frame rate, corresponding to the video feed, and one or more additional streams. An additional stream may be the same video stream as the "primary" stream but at a different resolution and/or frame rate, or a stream that shows a portion of the "primary" stream (e.g., cropped to include portion of the field of view or pixels of the primary stream) at the same or different resolution and/or frame rate as the "primary" stream.

Figure 3:
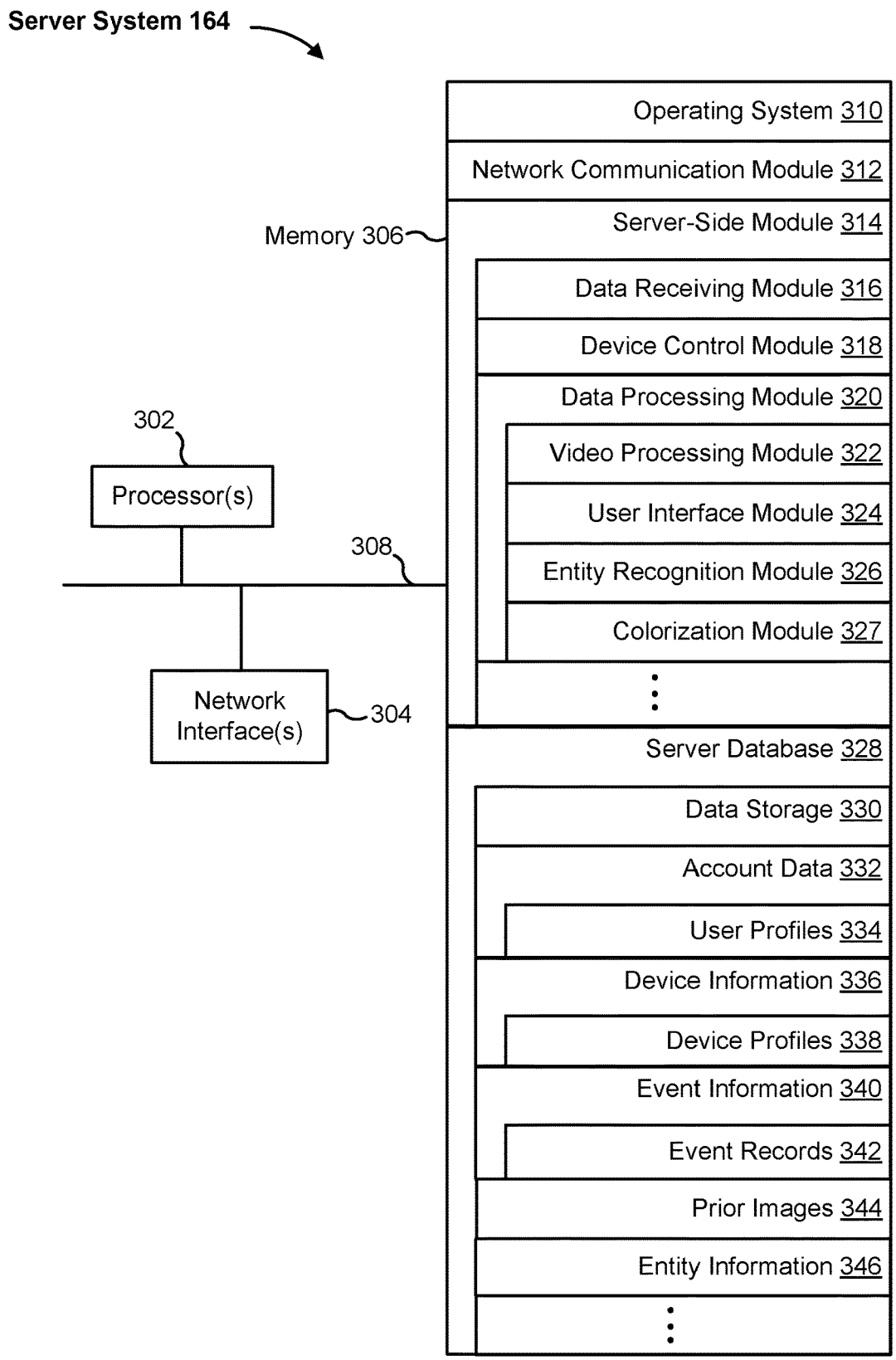
FIG. 3 is a block diagram illustrating a representative server system in accordance with some implementations.

FIG. 3 is a block diagram illustrating the server system 164 in accordance with some implementations. The server system 164 includes one or more processor(s) (e.g., CPUs) 302, one or more network interfaces 304 (e.g., including an I/O interface to one or more client devices and an I/O interface to one or more electronic devices), memory 306, and one or more communication buses 308 for interconnecting these components (sometimes called a chipset). The memory 306 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, optionally, includes one or more storage devices remotely located from one or more processor(s) 302. The memory 306, or alternatively the non-volatile memory within memory 306, includes a non-transitory computer-readable storage medium. In some implementations, the memory 306, or the non-transitory computer-readable storage medium of the memory 306, stores the following programs, modules, and data structures, or a subset or superset thereof:

- an operating system 310 including procedures for handling various basic system services and for performing hardware dependent tasks;
- a network communication module 312 for connecting the server system 164 to other systems and devices (e.g., client devices, electronic devices, and systems connected to one or more networks 162) via one or more network interfaces 304 (wired or wireless);
- a server-side module 314, which provides server-side functionalities for device control, data processing, and data review, including, but not limited to:
    - a data receiving module 316 for receiving data from electronic devices (e.g., video data from a doorbell 106, FIG. 1), and preparing the received data for further processing and storage in the data storage database 3160;
    - a device control module 318 for generating and sending server-initiated control commands to modify operation modes of electronic devices (e.g., devices of a home environment 100), and/or receiving (e.g., from client devices 220) and forwarding user-initiated control commands to modify operation modes of the electronic devices;
    - a data processing module 320 for processing the data provided by the electronic devices, and/or preparing and sending processed data to a device for review (e.g., client devices 220 for review by a user), including, but not limited to:
        - a video processing module 322 for processing (e.g., categorizing and/or recognizing) detected entities and/or event candidates within a received video stream (e.g., a video stream from doorbell 106);
        - a user interface module 324 for communicating with a user (e.g., sending alerts, timeline events, etc. and receiving user edits and zone definitions and the like);
        - an entity recognition module 326 for analyzing and/or identifying persons detected within smart home environments; and
        - a colorization module 327 for colorizing images and/or converting images between color spaces; and
- a server database 328, including but not limited to:
    - a data storage 330 for storing data associated with each electronic device (e.g., each doorbell) of each user account, as well as data processing models, processed data results, and other relevant metadata (e.g., names of data results, location of electronic device, creation time, duration, settings of the electronic device, etc.) associated with the data, where (optionally) all or a portion of the data and/or processing associated with the hub device 180 or smart devices are stored securely;
    - account data 332 for user accounts, including user account information such as user profiles 334, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;
    - device information 336 related to one or more devices such as device profiles 338, e.g., device identifiers and hub device specific secrets, independently of whether the corresponding hub devices have been associated with any user account;
    - event information 340 such as event records 342 and context information, e.g., contextual data describing circumstances surrounding an approaching visitor;
    - prior images 344 such as prior background images and/or entity images captured by camera(s) in various lighting conditions; and entity information 346 such as information identifying and/or characterizing entities (e.g., in the home environment 100).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 306, optionally, stores a subset of the modules and data structures identified above. Furthermore, the memory 306, optionally, stores additional modules and data structures not described above (e.g., an account management module for linking client devices, smart devices, and smart home environments).

Figure 4:
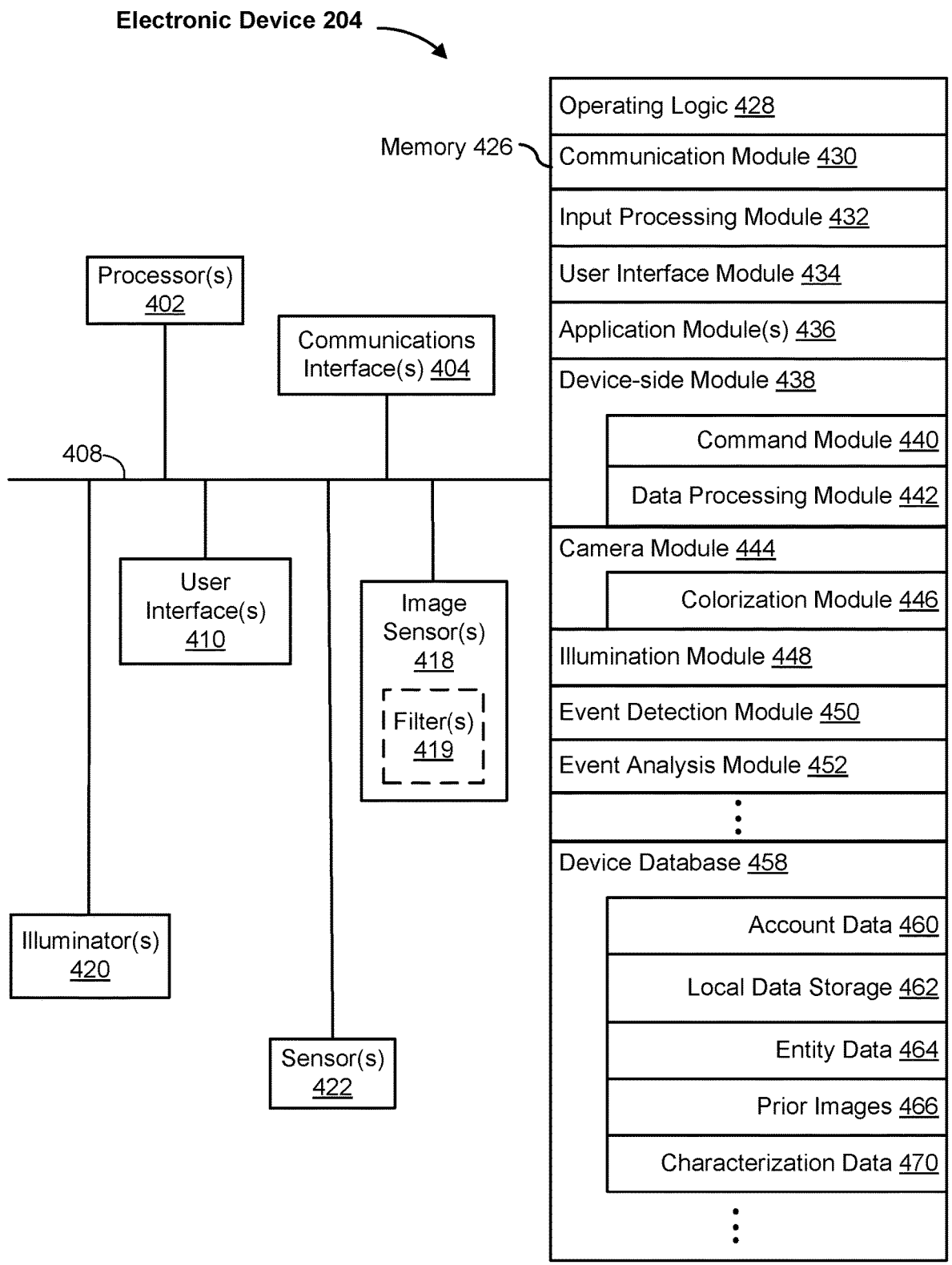
FIG. 4 is a block diagram illustrating a representative electronic device in accordance with some implementations.

FIG. 4 is a block diagram illustrating a representative electronic device 204 in accordance with some implementations. In some implementations, the electronic device 204 (e.g., any devices of a home environment 100, FIG. 1) includes one or more processor(s) (e.g., CPUs, ASICs, FPGAs, microprocessors, and the like) 402, one or more communication interfaces 404, user interface(s) 410, image sensor(s) 418, illuminator(s) 420, sensor(s) 422, memory 426, and one or more communication buses 408 for interconnecting these components (sometimes called a chipset). In some implementations, the user interface 410 includes one or more output devices that enable presentation of media content, such as one or more speakers and/or one or more visual displays. In some implementations, the user interface 410 includes one or more input devices such as user interface components that facilitate user input such as a keyboard, a mouse, a voice-command input unit or microphone, a touch screen display, a touch-sensitive input pad, a gesture capturing camera, or other input buttons or controls. In some implementations, an input device for a doorbell 106 is a tactile or touch-sensitive doorbell button. Furthermore, some electronic devices 204 use a microphone and voice recognition or a camera and gesture recognition to supplement or replace the keyboard.

The sensor(s) 422 include, for example, one or more thermal radiation sensors, ambient temperature sensors, humidity sensors, infrared (IR) sensors such as passive infrared (PIR) sensors, proximity sensors, range sensors, occupancy sensors (e.g., using RFID sensors), ambient light sensors (ALS), motion sensors 424, location sensors (e.g., GPS sensors), accelerometers, and/or gyroscopes.

The illuminator(s) 420 optionally include one or more visible light illuminators, one or more infrared illuminators (e.g., IR LEDs), and/or one or more ultraviolet illuminators. In some implementations, the electronic device 204 includes one or more filter(s) 419 for filtering out certain wavelengths of light, such as an IR cut filter. In some implementations, the filter(s) 419 are selectively engaged so as to selectively filter out certain wavelengths of light (e.g., at particular times).

The communication interfaces 404 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document. In some implementations, the communication interface(s) 404 include one or more radios. In some implementations, the radios enable one or more radio communication networks in the smart home environments, and enable an electronic device 204 to communicate with other devices. In some implementations, the radios are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.).

The memory 426 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 426, or alternatively the non-volatile memory within the memory 426, includes a non-transitory computer-readable storage medium. In some implementations, the memory 426, or the non-transitory computer-readable storage medium of the memory 426, stores the following programs, modules, and data structures, or a subset or superset thereof:

- operating logic 428 including procedures for handling various basic system services and for performing hardware dependent tasks;
- a communication module 430 for coupling to and communicating with other network devices (e.g., a network interface 160, such as a router that provides Internet connectivity, networked storage devices, network routing devices, a server system 164, other electronic devices 204, client devices 220, etc.) connected to one or more networks 162 via one or more communication interfaces 404 (wired or wireless);
- an input processing module 432 for detecting one or more user inputs or interactions from the one or more input devices and interpreting the detected inputs or interactions;
- a user interface module 434 for providing and presenting a user interface in which settings, captured data, and/or other data for one or more devices (e.g., the electronic device 204, and/or other devices in a home environment 100) can be configured and/or viewed;
- one or more applications 436 for execution by the smart device (e.g., games, social network applications, smart home applications, and/or other web or non-web based applications) for controlling devices (e.g., executing commands, sending commands, and/or configuring settings of the electronic device 204 and/or other client/electronic devices), and for reviewing data captured by devices (e.g., device status and settings, captured data, or other information regarding the electronic device 204 and/or other client/electronic devices);
- a device-side module 438, which provides device-side functionalities for device control, data processing and data review, including but not limited to:
  - a command module 440 for receiving, forwarding, and/or executing instructions and control commands (e.g., from a client device 220, from a server system 164, from user inputs detected on the user interface 410, etc.) for operating the electronic device 204; and
  - a data processing module 442 for processing data captured or received by one or more inputs (e.g., input devices, image sensor(s) 418, sensors 422, interfaces (e.g., communication interfaces 404), and/or other components of the electronic device 204, and for preparing and sending processed data to a remote device (e.g., client devices 220) for review by a user;

a camera module 444 for operating the image sensor(s) 418 and associated circuitry, e.g., for enabling and disabling the image sensor(s) 418 based on data from one or more sensors 422 (e.g., data from a PIR sensor or ALS), including a colorization module 446 for colorizing and/or converting raw image data captured by the image sensor(s) 418;

an illumination module 448 for enabling and disable the illuminator(s) 420, e.g., based on lighting conditions and/or modes of operation of the image sensor(s) 418 and filter(s) 419;

an event analysis module 450 for analyzing captured sensor data, e.g., to characterize and/or recognize motion entities and context information; and device database 548 storing data associated with devices (e.g., the electronic device 204), including, but not limited to:

account data 460 storing information related to user accounts linked to the electronic device 204, e.g., including cached login credentials, smart device identifiers (e.g., MAC addresses and UUIDs), user interface settings, display preferences, authentication tokens and tags, password keys, and the like;

local data storage 462 for selectively storing raw or processed data associated with the electronic device 204, such as event data and/or video data captured by the image sensor(s) 418;

entity data 464 storing information related to detected persons and other entities, such as characterization information (e.g., characterization information 348) and associated images;

prior images 466 such as prior background images and/or entity images captured by camera(s) in various lighting conditions; and characterization data 470 for entities, persons, and/or events detected by, or associated with, the electronic device 204 (e.g., data generated or used by the event analysis module 452).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 426, optionally, stores a subset of the modules and data structures identified above. Furthermore, the memory 426, optionally, stores additional modules and data structures not described above, such as a sensor management module for managing operation of the sensor(s) 422.

Figure 5:
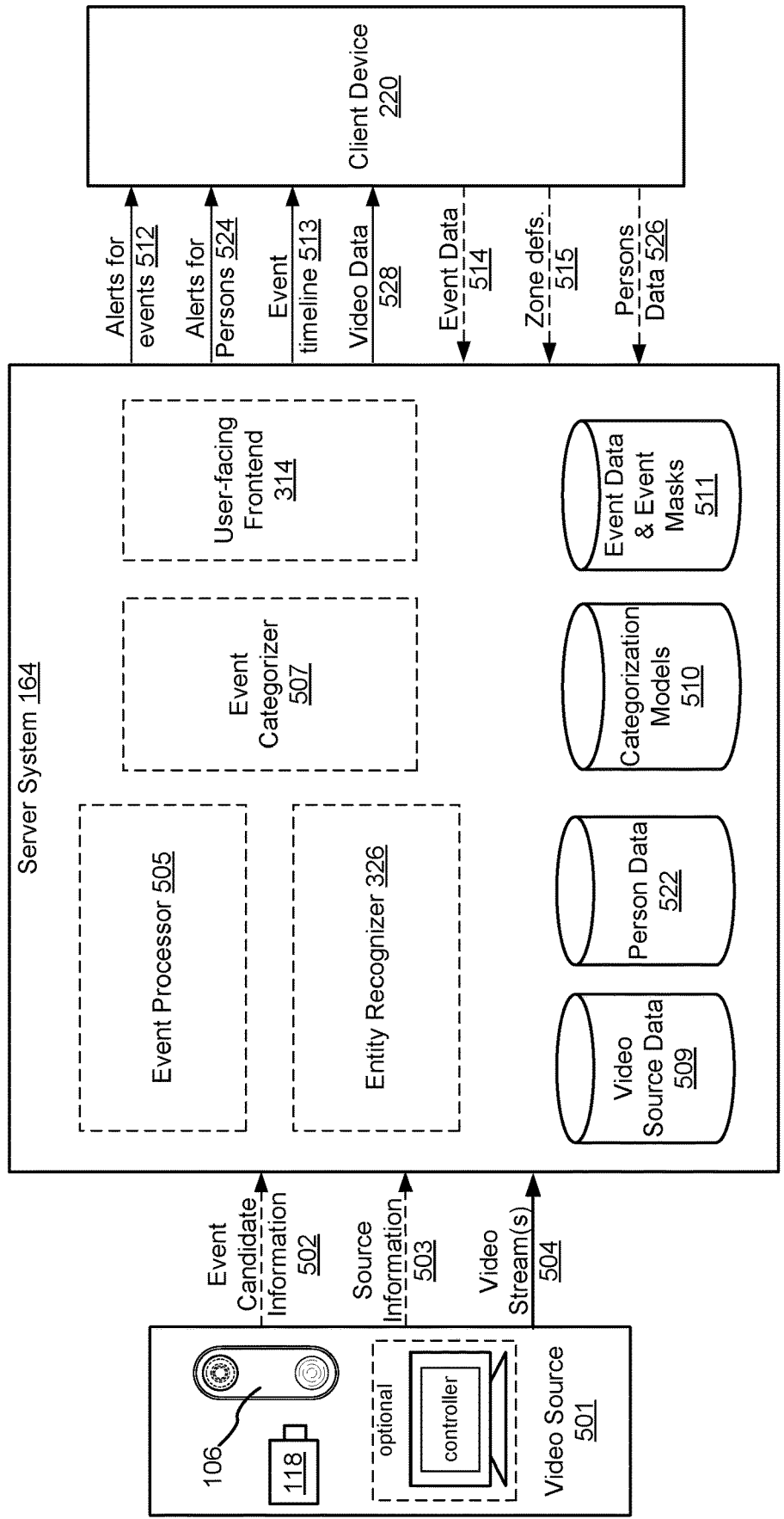
FIG. 5 illustrates representative system architecture for event analysis and categorization in accordance with some implementations.

FIG. 5 illustrates a representative system architecture 500 including video source(s) 501, server system 164, and client device(s) 220 in accordance with some implementations. In some implementations, the server system 164 includes functional modules for an event processor 505, an event categorizer 507, an entity recognizer 326, and a user-facing frontend 314. The event processor 505 obtains the event candidates (e.g., by processing the video stream(s) 504 or by receiving event start information from the video source 501, or by detecting a user press on a doorbell button of a doorbell camera). In some implementations, the event candidates comprise motion event candidates. In some implementations, the event candidates comprise audio event candidates. In some implementations, the event candidates include a user press on a doorbell button of a doorbell camera. In some implementations, the event candidates include audio, electromagnetic, olfactory, and/or visual aspects. In some implementations, the event candidates include motion events, approach detections, and announcement detections. The event categorizer 507 categorizes the event candidates into different event categories (e.g., based on data from the event processor and/or the entity recognizer). The user-facing frontend 314 generates event alerts and notifications, and facilitates review of the detected entities and events by a reviewer through a review interface on a client device 220. The user-facing frontend 314 also receives user edits on the event and entity categories, user preferences for alerts and event filters, zone definitions for zones of interest, and the like. The event categorizer optionally revises event categorization models and results based on the user edits received by the user-facing frontend. The entity recognizer optionally revises entity classifications and/or labels based on the user edits received by the user-facing frontend. The server system 164 also includes a video source data database 509, person data 522, event categorization models database 510, and event data and event masks database 511. In some implementations, the person data 522 includes a persons database. In some implementations, each of these databases is part of the server database 316 (e.g., part of data storage database 330).

The server system 164 receives one or more video stream(s) 504 from the video source 501 (e.g., a video source 222 from FIG. 2B) and optionally receives event candidate information 502, such as preliminary characterization information for detected entities and events (e.g., entity and event metadata from processing performed at the doorbell 106), and source information 503 such as device settings for a doorbell 106 (e.g., a device profile 338 for doorbell 106). In some implementations, the event processor 505 communicates with the video source 501 and/or one or more other devices of the smart home environment, e.g., to request additional image data, audio data, and sensor data, such as high definition images or metadata for the video stream(s) 504. The server system sends alerts for events 512, alerts for detected persons 524, event timeline information 513, and/or video data 528 (e.g., still images or video clips corresponding to the detected persons and/or events) to the client device 220. In some implementations, the alerts 512 distinguish visitor approach events from other types of motion events. In some implementations, the alerts 512 distinguish motion events captured at a doorbell 106 from motion events captured by other smart devices (e.g., cameras 118). The server system 164 optionally receives user information from the client device 220, such as event information 514 (e.g., edits to event categories), and zone definitions 515, and persons data 526 (e.g., classification of detected persons).

A data processing pipeline processes video information (e.g., a live video feed) received from a video source 501 (e.g., including a doorbell 106 and an optional controller device) and/or audio information received from one or more smart devices in real-time (e.g., within 10 seconds, 30 seconds, or 2 minutes) to identify and categorize events occurring in the smart home environment, and sends real-time event alerts (e.g., within 10 seconds, 20 seconds, or 30 seconds) and/or a refreshed event timeline (e.g., within 30 seconds, 1 minute, or 3 minutes) to a client device 220 associated with a reviewer account for the smart home environment. The data processing pipeline also processes stored information (such as stored video feeds from a video source 501) to reevaluate and/or re-categorize events as necessary, such as when new information is obtained regarding the event and/or when new information is obtained regarding event categories (e.g., a new activity zone definition is obtained from the user).

After video and/or audio data is captured at a smart device, the data is processed to determine if any potential event candidates or persons are present. In some implementations, the data is initially processed at the smart device (e.g., video source 501, camera 118, or doorbell 106). Thus, in some implementations, the smart device sends event candidate information, such as event start information, to the server system 164. In some implementations, the data is processed at the server system 164 for event start detection. In some implementations, the video and/or audio data is stored on server system 164 (e.g., in video and source data database 509). In some implementations, the visual/audio data is stored on a server distinct from server system 164. In some implementations, after a motion start is detected, the relevant portion of the video stream is retrieved from storage (e.g., from video and source data database 509).

In some implementations, the event identification process includes segmenting the video stream into multiple segments then categorizing the event candidate within each segment. In some implementations, categorizing the event candidate includes an aggregation of background factors, entity detection and identification, motion vector generation for each motion entity, entity features, and scene features to generate motion features for the event candidate. In some implementations, the event identification process further includes categorizing each segment, generating or updating an event log based on categorization of a segment, generating an alert for the event based on categorization of a segment, categorizing the complete event, updating the event log based on the complete event, and generating an alert for the event based on the complete event. In some implementations, a categorization is based on a determination that the event occurred within a particular zone of interest. In some implementations, a categorization is based on a determination that the event candidate involves one or more zones of interest. In some implementations, a categorization is based on audio data and/or audio event characterization.

The event analysis and categorization process may be performed by the smart device (e.g., the video source 501) and the server system 164 cooperatively, and the division of the tasks may vary in different implementations, for different equipment capability configurations, power parameters, and/or for different network, device, and server load situations. After the server system 164 categorizes the event candidate, the result of the event detection and categorization may be sent to a reviewer associated with the smart home environment.

In some implementations, the server system 164 stores raw or compressed video data (e.g., in a video and source data database 509), event categorization models (e.g., in an event categorization model database 510), and event masks and other event metadata (e.g., in an event data and event mask database 511) for each of the video sources 501. In some implementations, the video data is stored at one or more display resolutions such as 480p, 780p, 1080i, 1080p, and the like.

In some implementations, the video source 501 (e.g., the doorbell 106) transmits a live video feed to the remote server system 164 via one or more networks (e.g., the network(s) 162). In some implementations, the transmission of the video data is continuous as the video data is captured by the doorbell 106. In some implementations, the transmission of video data is irrespective of the content of the video data, and the video data is uploaded from the video source 501 to the server system 164 for storage irrespective of whether any motion event has been captured in the video data. In some implementations, the video data is stored at a local storage device of the video source 501 by default, and only video portions corresponding to motion event candidates detected in the video stream are uploaded to the server system 164 (e.g., in real-time or as requested by a user).

In some implementations, the video source 501 dynamically determines at what display resolution the video stream is to be uploaded to the server system 164. In some implementations, the video source 501 dynamically determines which parts of the video stream are to be uploaded to the server system 164. For example, in some implementations, depending on the current server load and network conditions, the video source 501 optionally prioritizes the uploading of video portions corresponding to newly detected motion event candidates ahead of other portions of the video stream that do not contain any motion event candidates; or the video source 501 uploads the video portions corresponding to newly detected motion event candidates at higher display resolutions than the other portions of the video stream. This upload prioritization helps to ensure that important motion events are detected and alerted to the reviewer in real-time, even when the network conditions and server load are less than optimal. In some implementations, the video source 501 implements two parallel upload connections, one for uploading the continuous video stream captured by the doorbell 106, and the other for uploading video portions corresponding to detected motion event candidates. At any given time, the video source 501 determines whether the uploading of the continuous video stream needs to be suspended temporarily to ensure that sufficient bandwidth is given to the uploading of the video segments corresponding to newly detected motion event candidates.

In some implementations, the video stream uploaded for cloud storage is at a lower quality (e.g., lower resolution, lower frame rate, higher compression, etc.) than the video segments uploaded for motion event processing.

As shown in FIG. 5, the video source 501 optionally includes a video doorbell 106 and an optional controller device. In some implementations, the doorbell 106 includes sufficient on-board processing power to perform all necessary local video processing tasks (e.g., cuepoint detection for motion event candidates, video uploading prioritization, network connection management, etc.), and the doorbell 106 communicates with the server system 164 directly, without any controller device acting as an intermediary. In some implementations, the doorbell 106 captures the video data and sends the video data to the controller device for the necessary local video processing tasks. The controller device optionally performs the local processing tasks for multiple cameras. For example, there may be multiple cameras in one smart home environment (e.g., the home environment 100, FIG. 1), and a single controller device receives the video data from each camera and processes the video data to detect motion event candidates in the video stream from each camera. The controller device is responsible for allocating sufficient outgoing network bandwidth to transmitting video segments containing motion event candidates from each camera to the server before using the remaining bandwidth to transmit the video stream from each camera to the server system 164. In some implementations, the continuous video stream is sent and stored at one server facility while the video segments containing motion event candidates are send to and processed at a different server facility.

In some implementations, the smart device sends additional source information 503 to the server system 164. This additional source information 503 may include information regarding a device state (e.g., IR mode, AE mode, DTPZ settings, etc.) and/or information regarding the environment in which the device is located (e.g., indoors, outdoors, night-time, day-time, etc.). In some implementations, the source information 503 is used by the server system 164 to perform event detection, entity recognition, and/or to categorize event candidates. In some implementations, the additional source information 503 includes one or more preliminary results from video processing performed by the video source 501 (e.g., a doorbell 106), such as categorizations, object/entity recognitions, motion masks, and the like.

In some implementations, the video portion after an event start incident is detected is divided into multiple segments. In some implementations, the segmentation continues until event end information (sometimes also called an "end-of-event signal") is obtained. In some implementations, the segmentation occurs within the server system 164 (e.g., by the event processor 505). In some implementations, the segmentation comprises generating overlapping segments. For example, a 10-second segment is generated every second, such that a new segment overlaps the prior segment by 9 seconds.

In some implementations, each of the multiple segments is of the same or similar duration (e.g., each segment has a 10-12 second duration). In some implementations, the first segment has a shorter duration than the subsequent segments. Keeping the first segment short allows for real time initial categorization and alerts based on processing the first segment. The initial categorization may then be revised based on processing of subsequent segments. In some implementations, a new segment is generated if the motion entity enters a new zone of interest.

In some implementations, after the event processor module obtains the video portion corresponding to an event candidate, the event processor 505 obtains background factors and performs motion entity detection identification, motion vector generation for each motion entity, and feature identification. Once the event processor 505 completes these tasks, the event categorizer 507 aggregates all of the information and generates a categorization for the motion event candidate. In some implementations, the event processor 505 and the event categorizer 507 are components of the video processing module 3144. In some implementations, false positive suppression is optionally performed to reject some motion event candidates before the motion event candidates are submitted for event categorization. In some implementations, determining whether a motion event candidate is a false positive includes determining whether the motion event candidate occurred in a particular zone. In some implementations, determining whether a motion event candidate is a false positive includes analyzing an importance score for the motion event candidate. The importance score for a motion event candidate is optionally based on zones of interest involved with the motion event candidate, background features, motion vectors, scene features, entity features, motion features, motion tracks, and the like.

In some implementations, the video source 501 has sufficient processing capabilities to perform, and does perform, entity detection, person recognition, background estimation, motion entity identification, the motion vector generation, and/or the feature identification.

FIG. 6 is a block diagram illustrating a representative client device 220 associated with a user account in accordance with some implementations. The client device 220, typically, includes one or more processor(s) (e.g., CPUs) 602, one or more network interfaces 604, memory 606, and one or more communication buses 608 for interconnecting these components (sometimes called a chipset). Optionally, the client device also includes a user interface 610 and one or more sensors 690 (e.g., accelerometer and gyroscope). The user interface 610 includes one or more output devices 612 that enable presentation of media content, including one or more speakers and/or one or more visual displays. The user interface 610 also includes one or more input devices 614, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection component 616, such as a GPS (global positioning satellite) sensor or other geo-location receiver, for determining the location of the client device.

The memory 606 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 606, optionally, includes one or more storage devices remotely located from one or more processing units 602. The memory 606, or alternatively the non-volatile memory within the memory 606, includes a non-transitory computer readable storage medium. In some implementations, the memory 606, or the non-transitory computer readable storage medium of the memory 606, stores the following programs, modules, and data structures, or a subset or superset thereof:

- an operating system 618 including procedures for handling various basic system services and for performing hardware dependent tasks;
- a network communication module 620 for connecting the client device 220 to other systems and devices (e.g., client devices, electronic devices, and systems connected to one or more networks 162) via one or more network interfaces 604 (wired or wireless);
- an input processing module 622 for detecting one or more user inputs or interactions from one of the one or more input devices 614 and interpreting the detected input or interaction;
- one or more applications 624 for execution by the client device (e.g., games, social network applications, smart home applications, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices);
- a user interface module 626 for providing and displaying a user interface in which settings, captured data, and/or other data for one or more devices (e.g., electronic devices 204 in home environment 100) can be configured and/or viewed;

a client-side module 628, which provides client-side functionalities for device control, data processing and data review, including but not limited to:

a device control module 630 for generating control commands for modifying an operating mode of smart devices (and optionally other electronic devices) in accordance with user inputs;

a video analysis module 632 for analyzing captured video data, e.g., to detect and/or recognize persons, objects, animals, and events;

a data review module 634 for providing user interfaces for reviewing data from the server system 164 or video sources 222, including but not limited to:

an event review module 636 for reviewing events (e.g., motion and/or audio events), and optionally enabling user edits and/or updates to the events; and a persons review module 638 for reviewing data and/or images regarding detected persons and other entities, and optionally enabling user edits and/or updates to the persons data;

a presentation module 640 for presenting user interfaces and response options for interacting with the electronic devices 204 and/or the server system 164;

a colorization module 641 for colorizing and/or converting images and video data received from one or more cameras; and a remote interaction module 642 for interacting with a remote person (e.g., a visitor to the home environment 100), e.g., via an electronic device 204 and/or the server system 164; and client data 644 storing data associated with the user account and electronic devices, including, but not limited to:

account data 646 storing information related to both user accounts loaded on the client device and electronic devices (e.g., of the video sources 501) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.;

a local data storage 648 for selectively storing raw or processed data associated with electronic devices (e.g., of the video sources 501, such as a doorbell 106), optionally including entity data described previously; and prior images 650 such as prior background images and/or entity images captured by camera(s) in various lighting conditions.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise rearranged in various implementations. In some implementations, the memory 606, optionally, stores a subset of the modules and data structures identified above. Furthermore, the memory 606, optionally, stores additional modules and data structures not described above.

FIGS. 7A-7D illustrate a colorization process 700 for infrared images in accordance with some implementations. In some implementations, the process 700 is performed by a camera device (e.g., a camera 118, smart doorbell 106, or other camera-equipped electronic device 204), a server system (e.g., the server system 164), and/or a client device (e.g., client device 220). In some implementations, the process 700 is performed by components of an electronic device 204, such as the colorization module 446, the event analysis module 452, or the device-side module 438, e.g., in conjunction with the image sensor(s) 418. In some implementations, the operations of the process 700 described herein are interchangeable, and respective operations of the process 700 are performed by any of the aforementioned devices. In some implementations, the process 700 is governed by instructions that are stored in a non-transitory computer-readable storage medium and that is executed by one or more processors or controllers of a device, such as the processor(s) 302, the processor(s) 402, and/or the processor(s) 602.

Figure 7A:
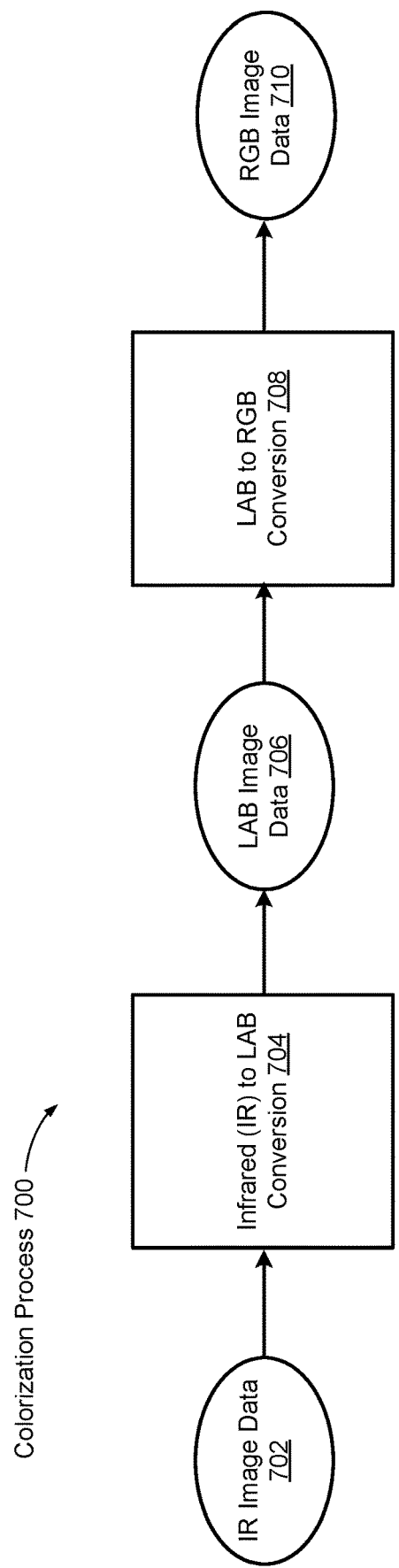
FIGS. 7A-7D illustrate a representative colorization process for infrared images in accordance with some implementations.

First, as shown in FIG. 7A, IR image data 702 is obtained. In some implementations, the IR image data 702 is generated by an image sensor (e.g., image sensor 418) that is capable of capturing infrared light (e.g., light with a wavelength in the range of 700 nm and 1 mm) and visible light (e.g., light with a wavelength in the range of 400 nm to 700 nm). In some implementations, the image sensor is capable of capturing a portion of the spectrum of infrared light, such as a portion corresponding to near-infrared light (e.g., light with a wavelength in the range of 700 nm to 1.4 microns).

In some implementations, the IR image data 702 is converted (704) to a LAB color space (also sometimes called a CIELAB color space) to obtain LAB image data 706. In the LAB color space color is represented as three values: an 'L' value for light intensity, an 'A' value for green-red components, and a 'B' value for blue-yellow components. In some implementations, the IR image data is converted to another color space instead, such as an XYZ, CIELUV, or CIEUVW color space.

In some implementations, the LAB image data 706 is converted (708) to RGB image data 710. For example, the LAB image data 706 is converted to a standard RGB (sRGB) color space. In some implementations, the RGB image data 710 represents colorized IR images and is provided to a user for viewing.

Figure 7B:
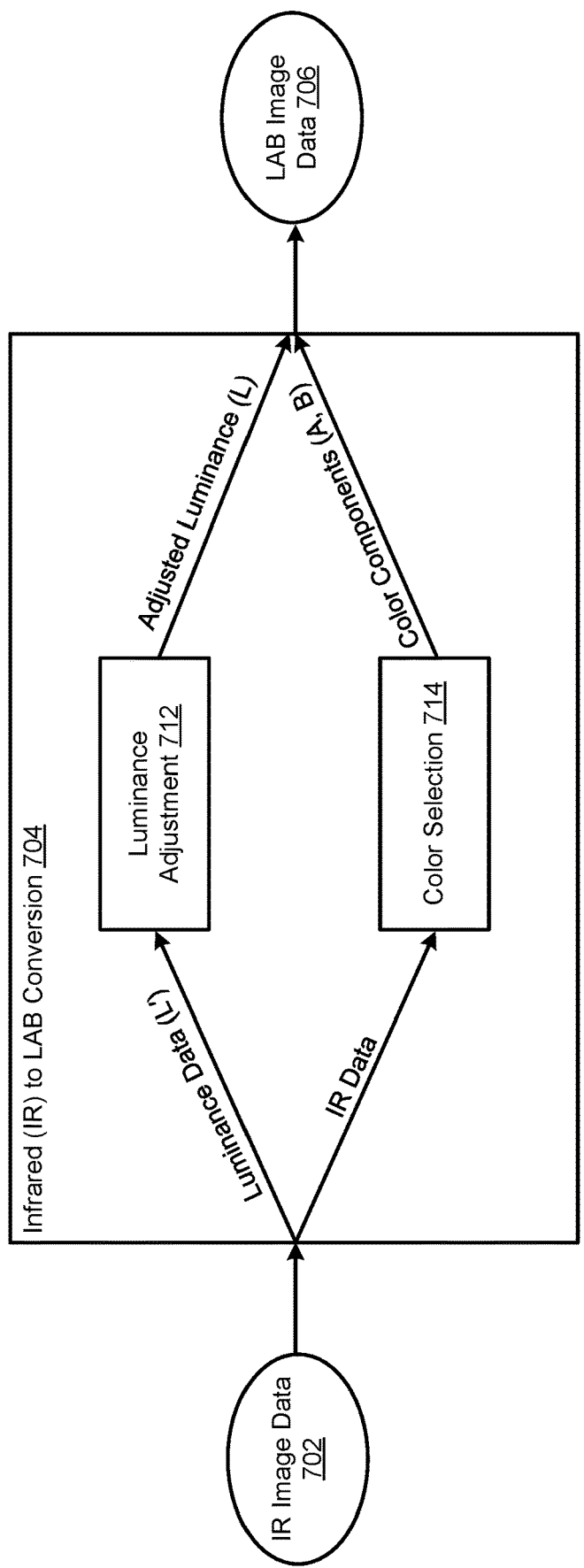

FIG. 7B shows additional details of the conversion of IR image data 702 to LAB image data 706 in accordance with some implementations. In some implementations, luminance data (L') is extracted from the IR image data 702. In some implementations, the luminance data L' is adjusted (712) to compensate for having higher luminance values closer to the IR illuminator(s) (e.g., IR illuminators 420 of the camera) and lower luminance values further from the IR illuminator(s). In some implementations, the adjusted L' is the L component of the LAB image data 706. In some implementations, the L' component is adjusted utilizing one or more histogram equalization techniques. In some implementations, the L' component is adjusted using a neural network (e.g., trained to compensate for the proximity-based variance in L'). In some implementations, the L' component is adjusted to compensate for reflectance of various surfaces within the image.

In some implementations, color selection (714) is performed based on the IR data 702 to generate color components A and B. In some implementations, a neural network is utilized to generate the color components A and B. In some implementations, the adjusted L' and the color components A, B combine as the LAB image data 706.

Figure 7C:
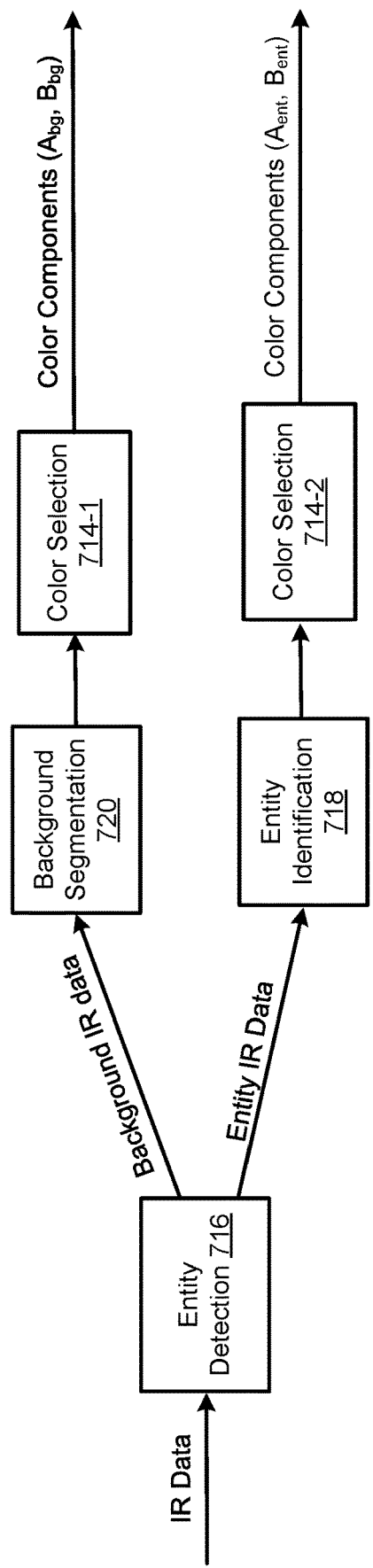

FIG. 7C shows details regarding colorization of images involving entities in accordance with some implementations. In some implementations, entity detection (716) is performed on the IR image data 702. For example, the entity detection is performed as described above with respect to FIG. 5. In some implementations, the IR data corresponding to detected entities is used to identify (718) each detected entity. For example, entities are identified as humans, pets, and cars. As another example, humans are identified as particular individuals known to the smart home system (e.g., identified as Jack and Jill respectively). In some implementations, the entity IR data is colorized (714-2) based on its identification. In some implementations, IR data corresponding to each entity is individually colorized based on the identification of the entity to generate color components $A_{ent}$ and $B_{ent}$. In some implementations, the IR data corresponding to each entity is individually colorized utilizing a neural network. In some implementations, the background IR data (e.g., the non-entity IR data) from the IR image data 702 is segmented (720) and each segment is colorized (714-1) to generate color components $A_{bg}$ and $B_{bg}$. In some implementations, the IR data corresponding to each background segment is individually colorized utilizing a neural network. In some implementations, the color components for the various sections of the IR image are combined to obtain the A and B color components for the IR image. For example, the $A_{ent}$ and $B_{ent}$ for each entity in the image is combined with the $A_{bg}$ and $B_{bg}$ for each background segment to obtain the A and B color components for the IR image.

Figure 7D:
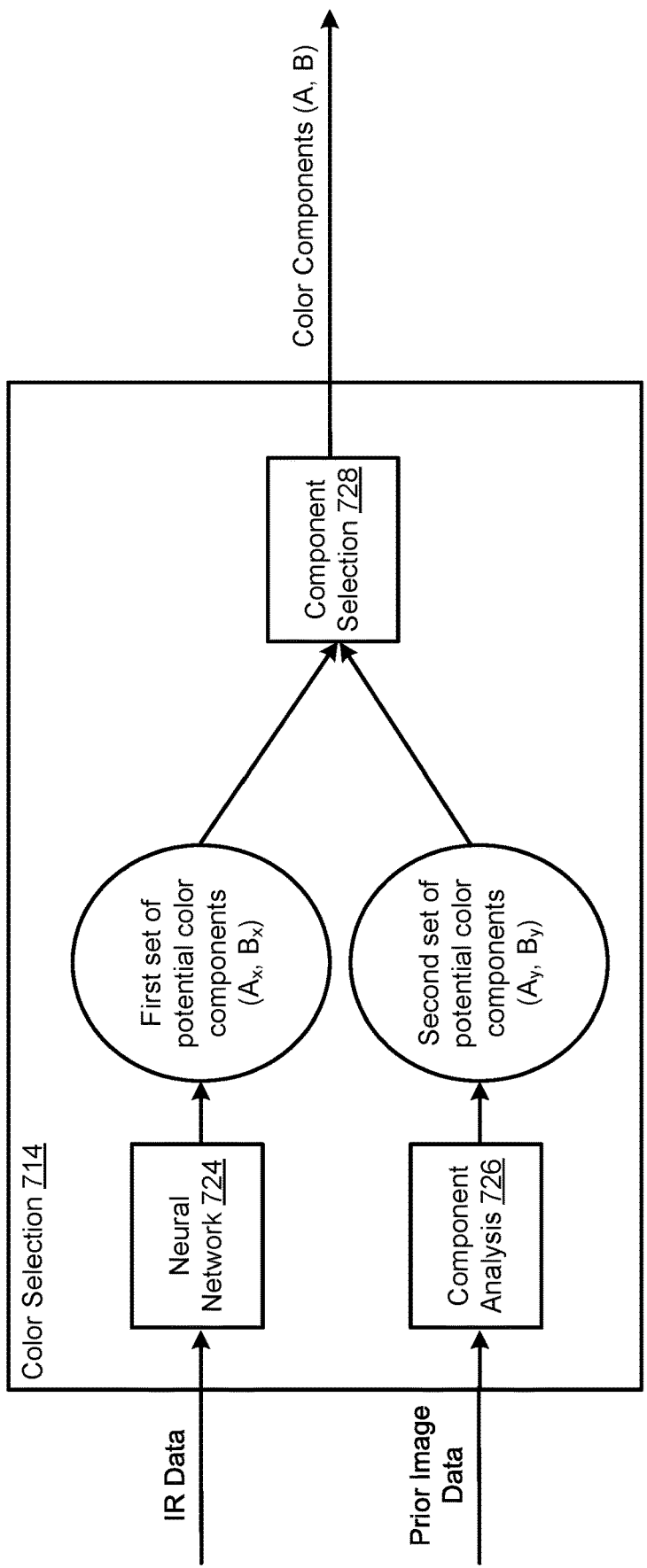

FIG. 7D illustrates additional details of the color selection (714) for generating the color components A and B in accordance with some implementations. In some implementations, the IR data (e.g., IR entity data or IR background data) is input into a neural network 724 to obtain a first set of potential color components ($A_x$, $B_x$). In some implementations, the IR data (e.g., IR entity data or IR background data) is input into the neural network 724 to obtain probabilities for all possible colors. In some implementations, the first set of potential color components includes a probability associated with each potential color component in the first set.

In some implementations, component analysis (726) is performed on prior image data to obtain a second set of potential color components ($A_y$, $B_y$). In some implementations, the prior image data is, or includes, one or more color images taken by the same camera that captured the IR data (e.g., the color images were taken during times when the scene is sufficiently lit). In some implementations, the prior image data is selected from a set of stored image data (e.g., prior images 344) based on a desired simulated lighting for the colorized IR images. In some implementations, the prior image data is selected from a set of stored image data (e.g., prior images 344) based on one or more common features with the IR images, e.g., objects determined to be in similar positions in both the prior image and the IR image. In some implementations, the prior image data is, or includes, one or more images in an RGB color space and/or one or more images in a LAB color space.

In some implementations, the prior image data is, or includes, one or more color images (e.g., RGB images) of entities identified in the IR image data during entity detection (716). In some implementations, one or more of the color images of the entities are obtained from the same camera that captured the IR images. In some implementa- tions, one or more of the color images of the entities are obtained from other cameras in the same smart home environment as the camera that captured the IR images. In some implementations, one or more of the color images of the entities are obtained from a user device associated with the smart home environment of the camera that captured the IR images. In some implementations, a first set of prior images are used for identified entities (e.g., as part of color selection process 714-2) and a second set of prior images are used for the background scene (e.g., as part of the color selection process 714-1).

In some implementations, the first and second sets of potential color components are used to select (728) the A and B color components. In some implementations, the probabilities of the first set of potential color components are combined with the probabilities of the second set of potential color components and the color components with the highest resulting probabilities are selected as the A and B color components. In some implementations, the combined probabilities are obtained by averaging the probabilities from each set. In some implementations, the combined probabilities are obtained via weighted averages (e.g., the prior image colors are weighted higher or lower than the neural network predicted colors). As one of skill in the art would recognize after having read the present disclosure, various processes and functions may be used to obtained the combined probabilities, e.g., log it functions, geometric means, arithmetic means, medians, weighted means, and etcetera.

Tables 1-3 below show example color component sets (with RGB colors for simplicity) for a hypothetical car to illustrate the component probabilities and selection process. In this example, a car is identified in the IR image data and a color selection process is used to determine the exterior color of the car. In accordance with some implementations, the IR image data corresponding to the exterior of the car is input into the neural network 724 and the neural network 724 outputs color and probability pairs as shown in Table 1 below.

TABLE 1

Example Potential Colors for Hypothetical Car Based on Neural Network

| Potential Color | Probability |
|---|---|
| Blue | 54% |
| Green | 23% |
| Purple | 10% |
| Brown | 8% |
| Fuchsia | 5% |

Continuing this example with the hypothetical car, in accordance with some implementations, prior color images of the car (e.g., in various lighting conditions) are obtained and analyzed (726). In some implementations and situations, the prior color images contain the same car in the same location, e.g., the IR images and the prior color images show the car parked in the driveway. In some implementations and situations, the prior color images contain the same car in different locations, e.g., the IR images show the car parked in the driveway and the color images show the car parked at various positions along the street. In some implementations and situations, the prior color images contain cars determined to be similar to the car in the IR images, e.g., the car in the IR images is determined to be a 1925 Ford Model T Touring and prior color images of 1925 Ford Model T Touring cars are obtained. Continuing this example, the analysis (726) of the prior color images results in the color and probability pairs shown in Table 2 below.

TABLE 2

Example Potential Colors for Hypothetical Car Based on Prior Images

| Potential Color | Probability |
| --- | --- |
| Green | 81% |
| Brown | 11% |
| Blue | 5% |
| Purple | 3% |
| Fuchsia | 0% |

Continuing this example with the hypothetical car, in accordance with some implementations, the potential color probabilities in Table 1 are combined with the potential color probabilities Table 2 to obtain combined probabilities for the potential colors as shown in Table 3 below. In accordance with some implementations, the combined probabilities in Table 3 are obtained by averaging the probabilities of Table 1 and Table 2.

TABLE 3

Example Combined Probabilities for Potential Colors

| Potential Color | Probability |
| --- | --- |
| Green | 52% |
| Blue | 29.5% |
| Brown | 9.5% |
| Purple | 6.5% |
| Fuchsia | 2.5% |

Continuing this example with the hypothetical car, in accordance with some implementations, the color of the car is assigned to be green as green has the highest probability of any color in Table 3.

Figure 8A:
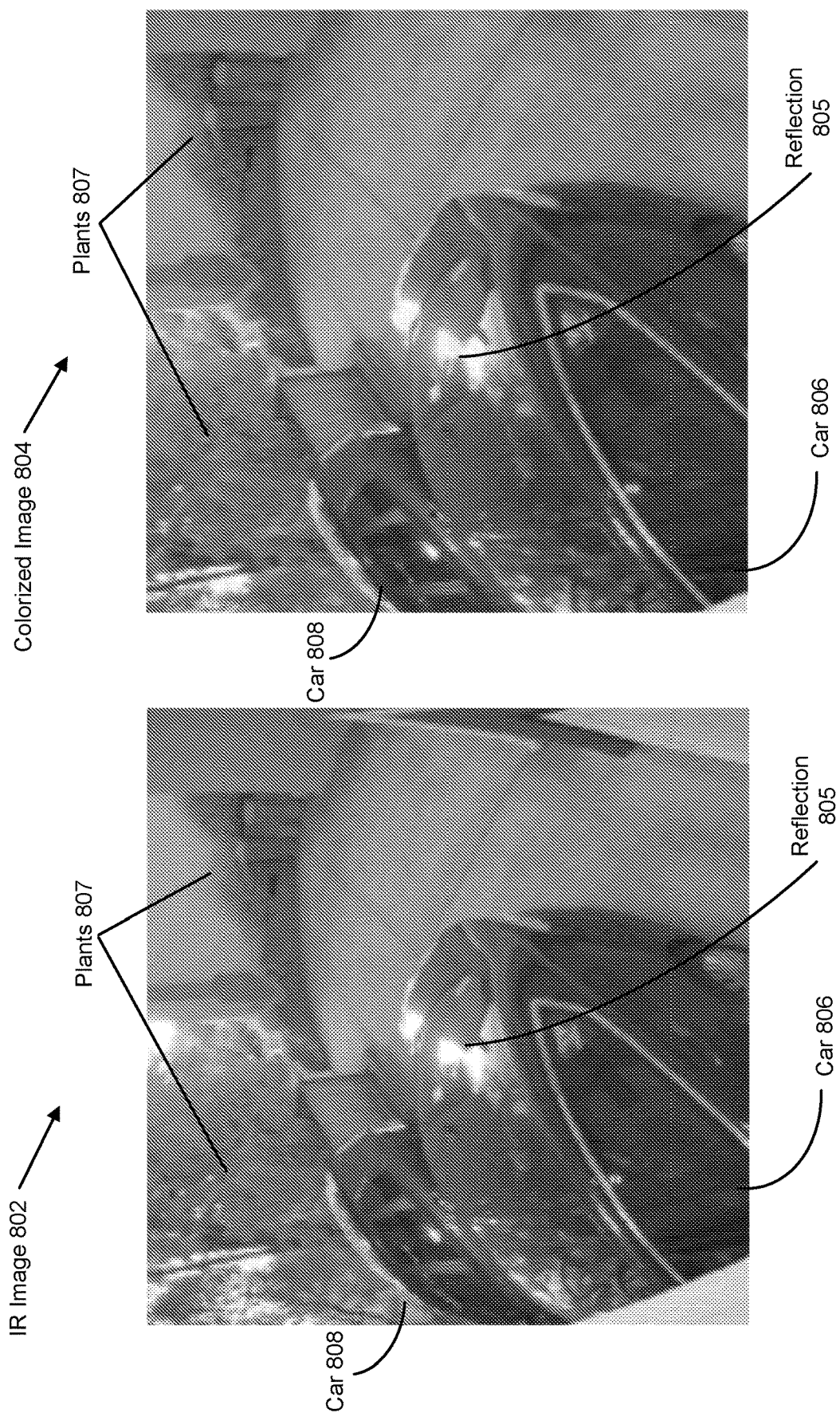
FIGS. 8A-8B illustrate infrared and colorized images in accordance with some implementations.
Figure 8B:
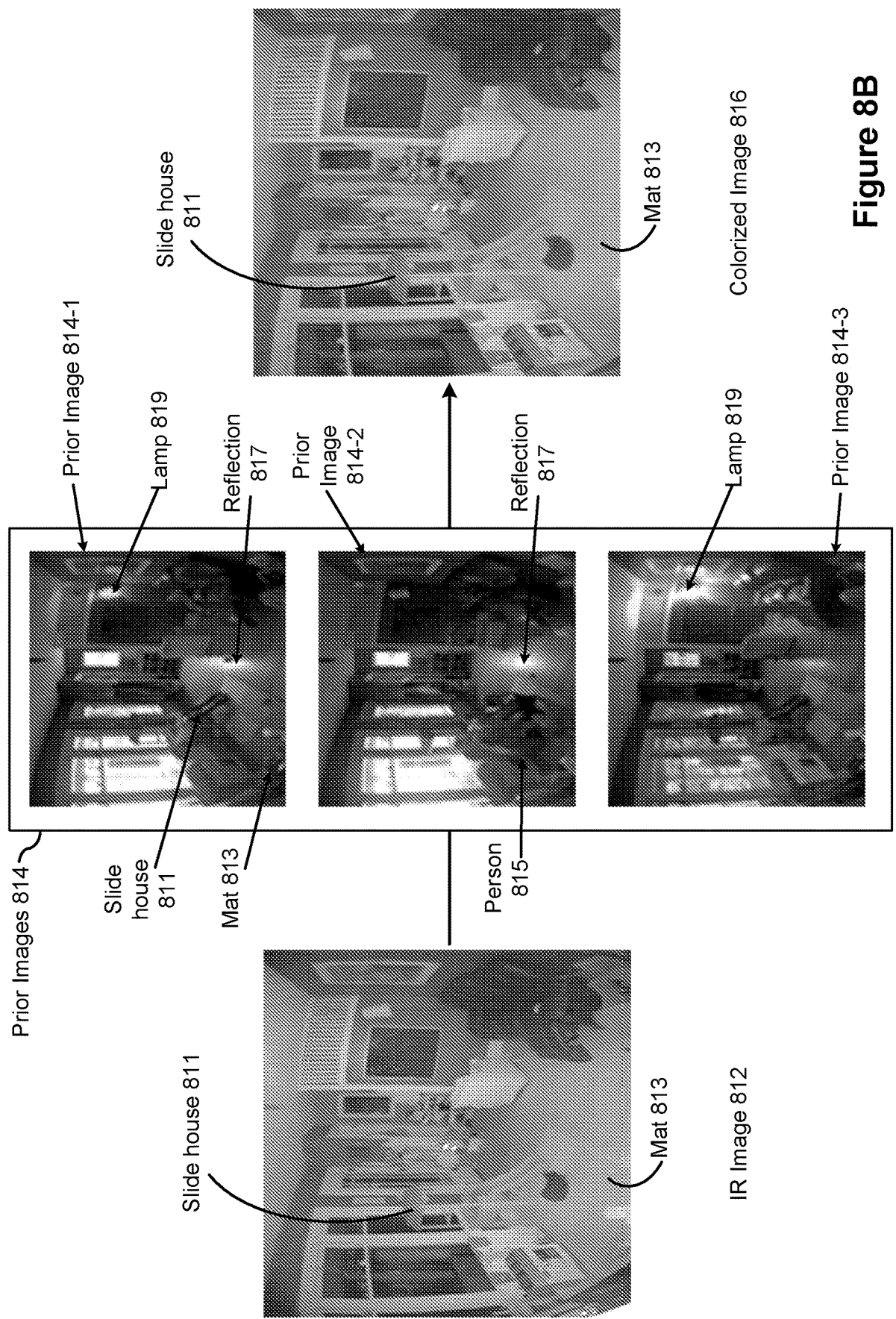

FIGS. 8A-8B illustrate infrared and colorized images in accordance with some implementations. FIG. 8A shows an IR image 802 of a driveway in dim light. The driveway includes a first car 806 on the bottom left, a second car 808 on the middle left, and plants 807 in the background of the IR image 802. The IR image 802 is captured by a camera (e.g., a camera 118). FIG. 8A also shows a colorization of the IR image 802 in colorized image 804. The colorized image 804 shows the car 806 as green, the car 808 as gray, and the plants 807 with different shades of green. The reflection 805 at the back of the car of 806 has a yellow tinge in the colorized image 804 because it is identified as reflection from the sun.

FIG. 8B shows an IR image 812 captured by a camera (e.g., a camera 118). The IR image 812 shows a scene of a play area that includes a slide house 811 and a mat 813. FIG. 8B also shows a set of prior images 814 of the scene that is captured at different times of the day. The prior images 814-1 and 814-3 show that the mat 813 has square blocks that are yellow, green, and red in color. The prior image 814-1 shows that the slide of the slide house 811 is blue. The prior image 814-2 shows that the roof of the slide house 811 is green. The prior image 814-2 also shows a person 815 sitting next to the slide house 811. FIG. 8B further shows a colorization of the IR image 812 based on the prior images 814 in colorized image 816. In accordance with some implementations, the prior images 814 includes color images of the scene with different lighting conditions. For example, the prior images 814-1 and 814-3 illustrate slight reflection 817 off the floor from light entering the back window whereas the reflection 817 is more intense in the prior image 814-2. The prior image 814-1 also shows, at the top right hand corner, some reflection on the ceiling from the lamp 819 whereas in the prior image 814-3, the reflection on the ceiling from the lamp 819 is more intense. In the colorized image 816, the mat 813 has square blocks with the same yellow, green, and red colors. The colorized image 816 shows the walls of the play area as blue and the slide house 811 as having a blue slide and a green roof. The colors in the colorized image 816 are presented without the lighting artifacts. In some implementations, the colorized images 804 and 816 are obtained via the processes described above with respect to FIGS. 7A-7D.

Figure 9A:
FIGS. 9A-9C illustrate a representative user interface for presenting video data in accordance with some implementations.
Figure 9B:
Figure 9C:
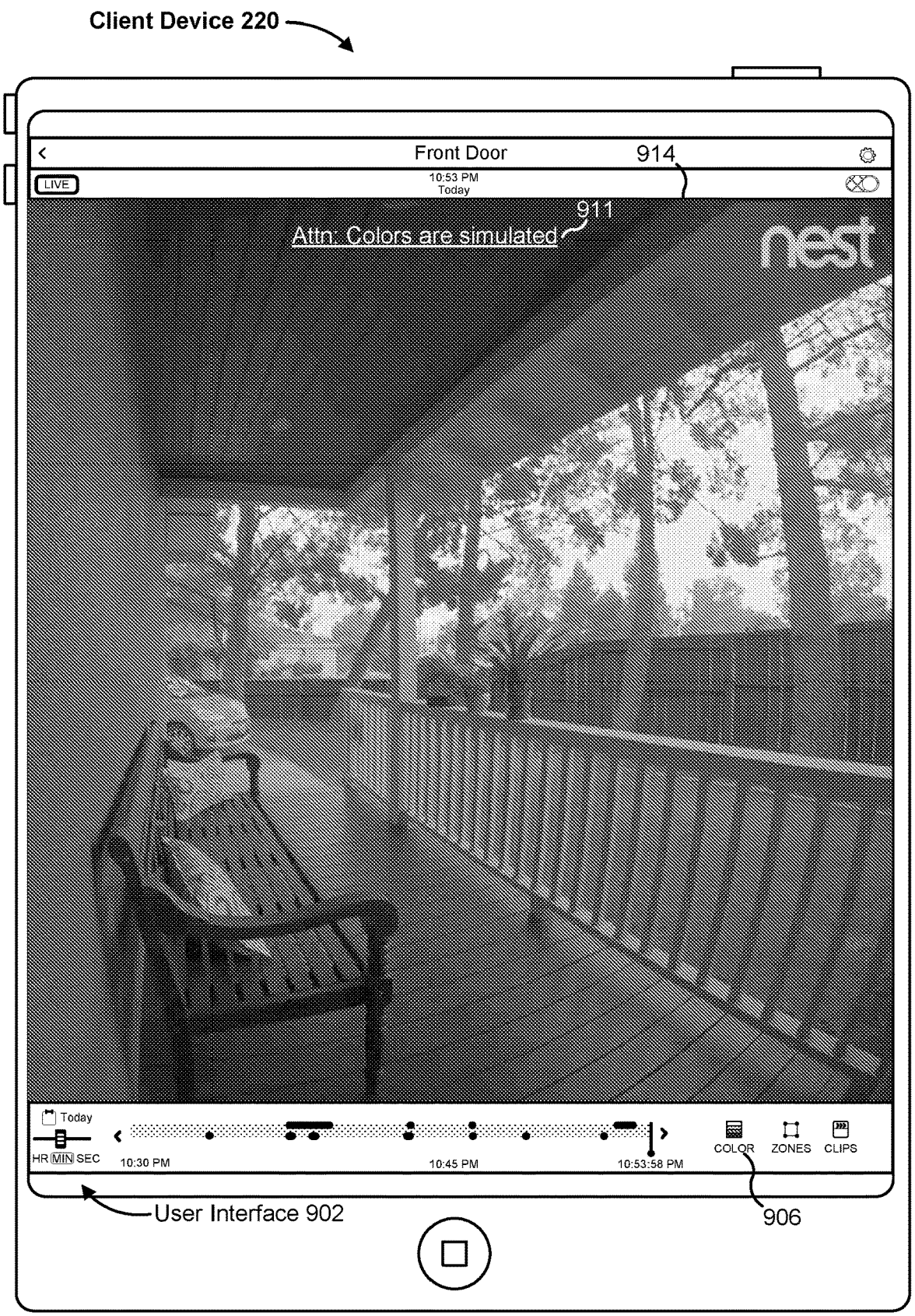

FIGS. 9A-9C illustrate a user interface 902 for presenting video data in accordance with some implementations. FIG. 9A shows a client device 220 displaying the user interface 902 with an IR image 904 of the scene. In the example of FIG. 9, the scene is a front porch of a house that includes a bench on the lower left hand corner of the image, railings that extend from the lower right hand corner to the middle of the image, a few pots of plants on the railings, and a car in the background of the scene. In some implementations, the IR image 904 is a live image of the scene, as indicated by the current position indicator 903 in FIG. 9A. In some implementations, the IR image 904 is a recorded image of the scene (e.g., corresponding to a past event captured by the camera). FIG. 9A further shows a user interface element 906 for colorization of the IR image 904.

FIG. 9B shows a colorization menu 907 displayed in response to selection of the colorization user interface (UI) element 906. In some implementations, the client device 220 has a touch screen and the UI element 906 is selected via a contact on the touch screen. In some implementations, the UI element 906 is selected via a cursor selection or other user input. The colorization menu 907 includes various lighting options for colorizing the IR image 904 in accordance with some implementations. In some implementations, the daylight option 908 corresponds to colorization of the IR image 904 to simulate daytime colors and lighting (e.g., simulating how the scene would appear at noontime on a given day). In some implementations, the twilight option 910 corresponds to colorization of the IR image 904 to simulate twilight colors and lighting (e.g., simulating how the scene would appear at twilight/dusk on a given day). In some implementations, the incandescent option 912 corresponds to colorization of the IR image 904 to simulate colors under incandescent lighting. In various implementations, more or less lighting options are optionally presented to the user. In some implementations, the lighting options are based on a setting of the scene (e.g., different lighting options are provided for outdoor and indoor scenes). In some implementations, the lighting options provided are based on lighting conditions in stored prior images of the scene (e.g., only lighting options that appear in the stored prior images are provided). In some implementations, no lighting options are provided and selection of the UI element 906 results in an automatic colorization of the scene. For example, in accordance with some implementations, selection of the UI element 906 in FIG. 9A results in display of the user interface shown in FIG. 9C without displaying the user interface shown in FIG. 9B.

FIG. 9C shows the user interface 902 with a colorized image 914 of the scene. The colorized image 914 shows the bench in brown, the railings in white, and the car in orange. In some implementations, the colorized image 914 is obtained via the process described above with respect to FIGS. 7A-7D. In some implementations, the colorized image 914 is a colorized version of the IR image 904, while in other implementations, the colorized image 914 is a live image of the scene (e.g., is subsequent to the IR image 904). In some implementations, the user interface 902 includes a notification 911 alerting the user that the displayed colors are simulated (and therefore may contain some inaccuracies). In some implementations, the colorization is toggleable through selection of the UI element 906.

Figure 10A:
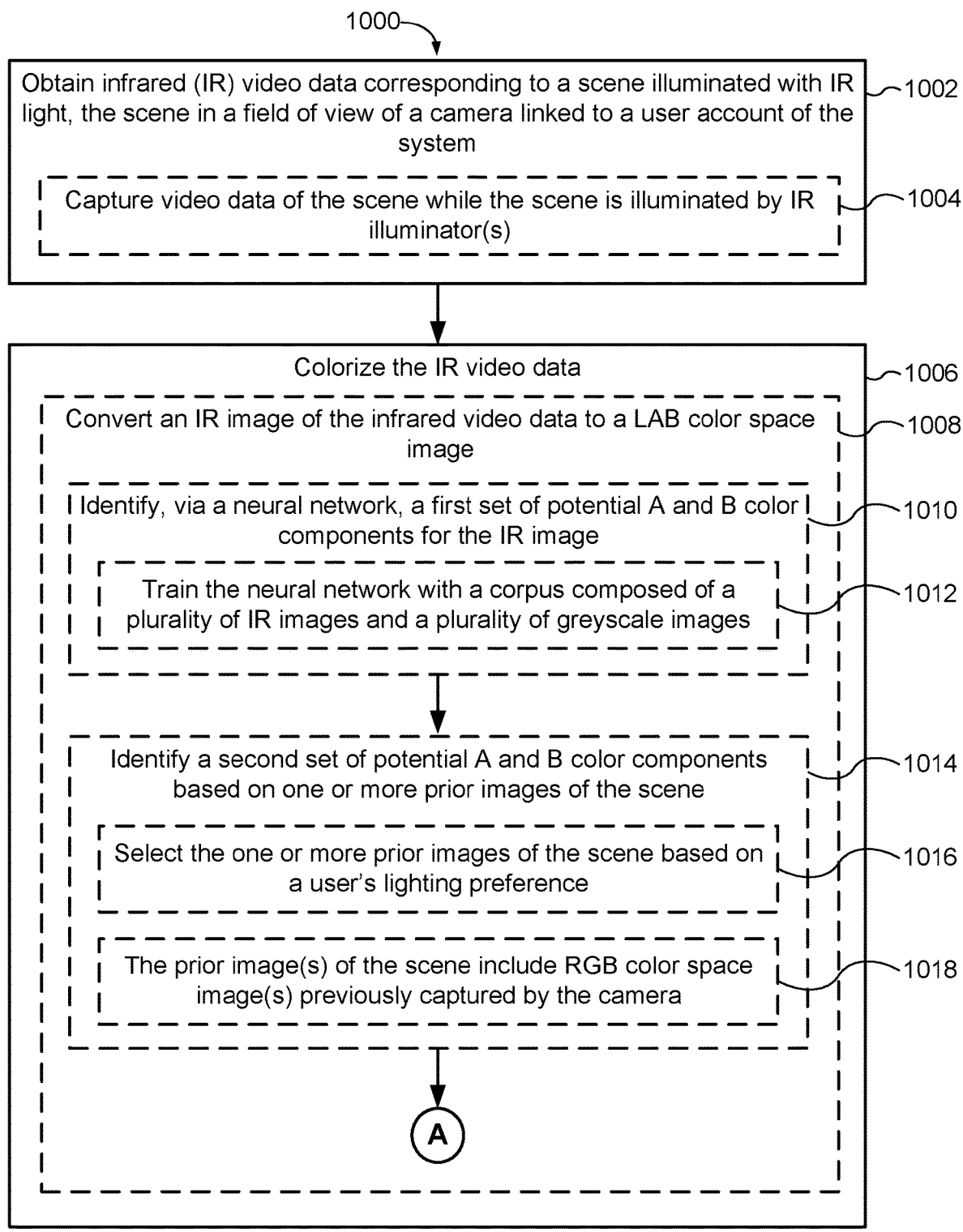
FIG. 10A-10B are flow diagrams illustrating a representative method of colorizing infrared images in accordance with some implementations.
Figure 10B:
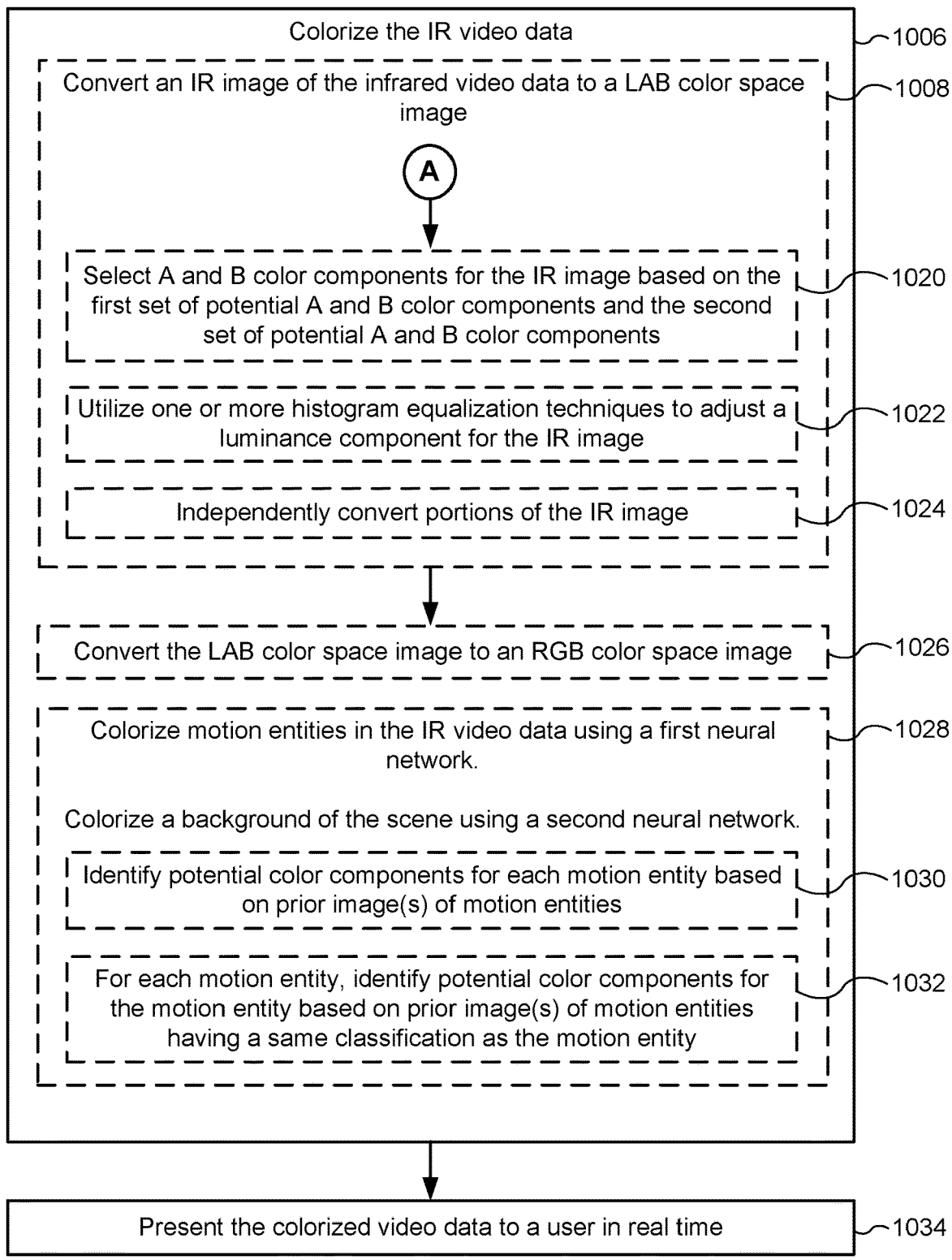

FIG. 10A-10B are flow diagrams illustrating a method 1000 of colorizing infrared images in accordance with some implementations. In some implementations, the method 1000 is performed by a camera device (e.g., a camera 118, smart doorbell 106, or other camera-equipped electronic device 204), a server system (e.g., the server system 164), and/or a client device (e.g., client device 220). In some implementations, the method 1000 is performed by components of an electronic device 204, such as the colorization module 446, the event analysis module 452, or the device-side module 438, e.g., in conjunction with the image sensor(s) 418. In some implementations, the operations of the method 1000 described herein are interchangeable, and respective operations of the method 1000 are performed by any of the aforementioned devices. In some implementations, the method 1000 is governed by instructions that are stored in a non-transitory computer-readable storage medium and that is executed by one or more processors or controllers of a device, such as the processor(s) 302, the processor(s) 402, and/or the processor(s) 602. For convenience, the method 1000 is described below as being performed by a system.

The system obtains (1002) infrared (IR) video data corresponding to a scene illuminated with IR light, the scene in a field of view of a camera linked to a user account of the smart home system (e.g., camera 118 of home environment 100). For example, IR image 802 in FIG. 8A shows a scene illuminated with IR light.

In some implementations, the system includes at least one of: the camera, a server system, and a client device. For example, the smart home system architecture 500 shown in FIG. 5 includes a camera 118, a server system 164, and a client device 220.

In some implementations, the camera captures (1004) video data of the scene while the scene is illuminated by IR illuminator(s) (e.g., illuminators 420, FIG. 4). In some implementations, the camera includes a plurality of IR illuminators and an image sensor sensitive to IR light (e.g., image sensor 418). In some implementations, the image sensor is capable of capturing visible and IR light wavelengths. In some implementations, obtaining the IR video data includes capturing video data of the scene while the scene is illuminated by the plurality of IR illuminators.

The system colorizes (1006) the IR video data. In some implementations, the system colorizes the IR video data utilizing a colorization module (e.g., colorization module 327, colorization module 446, and/or colorization module 641). In some implementations, colorizing the IR video data includes converting the IR video data to a LAB color space, including using previously-captured color images to inform the selection of the A and B color components. In some implementations, colorizing the IR video data includes converting the LAB image data to an RGB color space.

In some implementations, the system converts (1008) an IR image of the infrared video data to a LAB color space image. For example, in some implementations, the system adjusts a luminance L' from the IR image data 702 (as illustrated in FIG. 7B) and selects color components A and B (as illustrated in FIG. 7D). In some implementations, the system utilizes one or more color images of the scene to select colors for the LAB color image. In some implementations, the system performs object and/or entity recognition on the IR video data and colorizes recognized objects and/or entities independently from one another and the remainder of the IR video data. In some implementations, the system utilizes distinct sets of color images to colorize the individual recognized objects and entities. In some implementations, the system converts the IR image to a non-LAB color space, such as an RGB color space or an XYZ color space.

In some implementations, the system identifies (1010), via a neural network, a first set of potential A and B color components for the IR image (e.g., components $A_x$ and $B_x$ in FIG. 7D). In some implementations, the system identifies probabilities of all possible colors (A, B). In some implementations, the neural network is a convolutional neural network (CNN). In some implementations, the neural network comprises a Pix2Pix style network or a CycleGAN style network. In some implementations, the neural network outputs a vector with probabilities for each of the A and B color components in the first set of potential A and B color components (e.g., vectors analogues to the vectors illustrated above in Table 1). In some implementations, the first set of potential A and B color components are ranked based on a user lighting preference. For example, a user requests to colorize the IR video data to simulate twilight lighting and the first set of potential A and B color components are ranked with twilight colors given more weight.

In some implementations, the system trains (1012) the neural network with a corpus composed of a plurality of IR images and a plurality of greyscale images. In some implementations, the system trains the neural network with a corpus consisting of IR images. in some implementations, the neural network is trained using a computing system that is distinct from the system. In some implementations, the neural network is trained with images having a particular lighting type (e.g., twilight images, daylight images, incandesce images, and the like).

In some implementations, the system identifies (1014) a second set of potential A and B color components based on one or more prior images of the scene (e.g., potential color components $A_y$ and $B_y$ from FIG. 7D). In some implementations, the system identifies probabilities of all possible colors (A, B) based on the one or more prior images of the scene. In some implementations, the one or more prior images of the scene are utilized to generate a second vector with probabilities for each of the A and B color components in the second set of potential A and B color components (e.g., vectors analogous to the vectors illustrated above in Table 2). In some implementations, the prior images of the scene include images previously captured by the camera. In some implementations, the prior images of the scene include RGB images of the scene. In some implementations, the prior images of the scene include one or more images captured by other cameras in the smart home environment.

In some implementations, the system selects (1016) the one or more prior images of the scene based on a user's lighting preference. In some implementations, the prior image(s) have lighting corresponding to the lighting preference. In some implementations, the lighting preference is one of: dawn, full daylight, dusk, twilight, incandescent lighting, and the like. In some implementations, the system selects differently trained neural networks based on the users lighting preferences. For example, the system utilizes a first neural network trained on daylight images for a daylight lighting preference and utilizes a second neural network trained on twilight images for a twilight lighting preference.

In some implementations, the prior image(s) of the scene include (1018) RGB color space image(s) previously captured by the camera. In some implementations, the prior images are captured when an ambient light level of the scene is above a light threshold. In some implementations, the prior images are captured in conjunction with use of one or more illuminators of the camera (e.g., illuminators 420, FIG. 4). In some implementations, the camera is configured to capture IR and RGB images. For example, the camera has an image sensor capable of capturing visible and IR light wavelengths. In some examples, the camera enables the IR filter to capture RGB images and disables the IR filter to capture IR images. In some implementations, the RGB color space images were captured while an IR filter was in front of the camera's image sensor, and the IR images were captured while the IR filter is not in front of the camera's image sensor. In some implementations, the camera is configured to periodically capture color images of the scene for use as prior images. In some implementations, in a low-light situation, the camera is configured to capture one or more IR images of the scene, and then enable one or more visible illuminators and capture corresponding color images of the scene (e.g., to inform colorization of the IR images). In some implementations, in a non-low-light situation, the camera is configured to capture one or more color images of the scene with an IR filter in place over the image sensor, and then capture one or more images of the scene with the IR filter disabled (e.g., to inform colorization of IR images in low-light situations). In various implementations, the system utilizes between 1 and 10 prior images, 1 and 100 prior images, or 1 and 1000 prior images to colorize the IR video data (e.g., to generate the potential color components $A_y$ and $B_y$ in FIG. 7D)

In some implementations, the prior images are images that were not used to train the neural network. For example, the neural network is trained before the prior images are captured. In some implementations, the neural network is trained on public images (e.g., images that the owners have indicated may be publically shared), and the prior images are private to the owner of the camera. In some implementations, the one or more images were captured in accordance with a motion sensor not sensing motion in the scene. For example, one or more background images of the scene are captured while a motion sensor indicates that an event is not occurring. In some implementations, one or more entity images are captured while the motion sensor indicates that an event is occurring.

In some implementations, the system selects (1020) A and B color components for the IR image based on the first set of potential A and B color components and the second set of potential A and B color components (e.g., as discussed above with respect to FIG. 7D). In some implementations, probabilities for the first potential A and B components are combined with probabilities for the second potential A and B components, and A and B components with a highest combined probability are selected. In some implementations, the probabilities are averaged together. In some implementations, the probabilities are weighted and averaged. In some implementations, a third set of potential A and B color components are identified based on rare colors (e.g., to achieve more saturated colors).

In some implementations, the system utilizes (1022) one or more histogram equalization techniques to adjust a luminance component for the IR image (e.g., as illustrated in FIG. 7B). In some implementations, adaptive histogram equalization (AHE) is utilized to adjust the luminance component. In some implementations, contrast limited adaptive histogram equalization (CLAHE) is utilized to adjust the luminance component. In some implementations, the L luminance component is adjusted to compensate for having higher luminance (intensity) values closer to IR illuminators (of the camera) and lower luminance (intensity) values further from the IR illuminators. In some implementations, the L luminance component is adjusted utilizing a neural network rather than via histogram equalization (e.g., a neural network trained with IR images). In some implementations, information related to positioning of IR illuminators and the image sensor is used to adjust the luminance component.

In some implementations, the system independently converts (1024) portions of the IR image to the LAB color space. For example, the system divides the image into 4096 portions, each portion being ¼₄ of the width and ¼₄ of the length of the image, and converts each portion separately. In some implementations, each portion is colorized independently. In some implementations, colorization of each portion is influenced or informed by colorization of neighboring portions. In some implementations, each portion is colorized with weighting based on colorization of neighboring portions. In some implementations, the IR image is partitioned into portions based on objects and/or contours within the scene.

In some implementations, the system converts (1026) the LAB color space image to an RGB color space image. In some implementations, the system presents the LAB images to the user (e.g., at a client device 220).

In some implementations, the system colorizes (1028) motion entities in the IR video data using a first neural network, and colorizes a background of the scene using a second neural network (e.g., as discussed above with respect to FIG. 7C). In some implementations, the system identifies one or more motion entities (e.g., utilizing entity recognizer 326) and the colorizes the identified motion entities individually. In some implementations, the system identifies one or more objects and colorizes the identified objects individually.

In some implementations, the system identifies (1030) potential color components for each motion entity based on prior image(s) of the motion entities. In some implementations, the prior images of motion entities include images from other cameras within the smart home environment. In some implementations, the prior images of motion entities include images from cameras not part of the smart home environment. In some implementations, the one or more prior images were captured in accordance with a motion sensor sensing motion in the scene.

In some implementations, for each motion entity, the system identifies (1032) potential color components for the motion entity based on prior image(s) of motion entities having a same classification as the motion entity. In some implementations, the system classifies the one or more motion entities. In some implementations, colorizing the one or more motion entities includes, for each motion entity, identifying potential color components for the motion entity based on one or more prior images of motion entities having a same classification as the motion entity. For example, the classification distinguishes between cars, people, cats, dogs, and the like. In some implementations, a motion entity is recognized as a particular person, and colorizing the motion entity is based on prior images of the particular person.

The system presents (1034) the colorized video data (e.g., colorized image 804, FIG. 8A) to the user in real time. For example, the colorized video data is presented to the user via a client device.

In some implementations, the camera does not include an IR filter for the image sensor. In some implementations, the system captures one or more RGB color space images; adjusts the captured images to remove an IR contribution; and presents the adjusted images to the user. In some implementations, the IR contribution is removed via a neural network (e.g., using pix2pix). For example, a neural network trained on one or more of: RGB images, IR images, and images with visible and IR contributions.

In some implementations, a system is a smart home system that includes one or more video cameras (e.g., a camera 118) and a remote server system (e.g., server system 164). In some implementations, the system obtains, via a video camera of the one or more video cameras, a continuous stream of video data for a scene. In some implementations, the system and the video camera are wirelessly coupled to one another via one or more wireless networks and the system obtains the video data while the wireless connection is present.

In some implementations, the video data stream includes: color video data (e.g., RGB images) in accordance with a determination that the scene has illumination above an illumination threshold; and infrared (IR) video data in accordance with a determination that the scene does not have illumination above the illumination threshold. In some implementations, the camera includes an ambient light sensor (ALS) and captures color images in accordance with the ALS indicating that the visible light levels of the scene meet one or more predefined criteria. In some implementations, the camera captures IR images in accordance with the ALS indicating that the visible light levels of the scene do not meet the one or more predefined criteria.

In some implementations, the video data stream includes mode information indicating whether the camera is in a visible light capture mode or an IR light capture mode. In some implementations, the video data stream includes information regarding whether an IR cut filter is enabled.

In some implementations, the system colorizes the IR video data based on a subset of the color video data. In some implementations, the system presents the colorized video data to a user in real time. In some implementations, the system presents the colorized video data to a user in response to a user request for colorization.

In some implementations, the system colorizes stored image data in accordance with a request from a user to colorize a past video clip. In some implementations, the system receives a request from a user to generate a colorized video clip from the IR video data. In some implementations, the system receives a lighting preference from the user (e.g., as illustrated in FIG. 9B). In some implementations, the system colorizes the IR video data in accordance with the lighting preference. In some implementations, the system presents the colorized video clip to the user.

Although the system described above with respect to FIGS. 10A-10B are described in the context of smart home environments, the system, devices, and methods may also be used in other contexts. For example, colorization of IR data may be used for car dash cameras, traffic cameras, and the like.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first camera could be termed a second camera, and, similarly, a second camera could be termed a first camera, without departing from the scope of the various described implementations. The first camera and the second camera are both cameras, but they are not the same camera unless explicitly stated as such.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method performed at a system that comprises one or more video cameras and a remote server system, the method comprising:

obtaining, via a video camera of the one or more video cameras, video data for a scene, wherein the video data comprises:

color video data in accordance with a determination that the scene has illumination above an illumination threshold; and infrared (IR) video data in accordance with a determination that the scene does not have illumination above the illumination threshold;

colorizing the IR video data based on a subset of the color video data, the colorizing including converting an IR image of the infrared video data to a LAB color space image, identifying, via a neural network, a first set of potential A and B color components for the IR image, identifying a second set of potential A and B color components based on one or more prior images of the scene, and selecting A and B color components for the IR image based on the first set of potential A and B color components and the second set of potential A and B color components; and presenting the colorized video data to a user in real time.

2. The method of claim 1, further comprising training the neural network with a corpus composed of a plurality of IR images and a plurality of non-IR gray scale images.

3. The method of claim 1, further comprising:
receiving a lighting preference from a user of the system; and
selecting the one or more prior images of the scene based on the lighting preference.

4. The method of claim 1, wherein the one or more prior images of the scene comprise one or more RGB color space images previously captured by the camera.

5. The method of claim 1, wherein converting to the LAB color space image comprises utilizing one or more histogram equalization techniques to adjust an L luminance component for the IR image.

6. The method of claim 1, wherein colorizing the IR video data comprises independently converting portions of the IR image.

7. The method of claim 1, wherein colorizing the IR video data comprises converting from a LAB color space image to an RGB color space image.

8. The method of claim 1, wherein the camera includes a plurality of IR illuminators and an image sensor sensitive to IR light; and
wherein obtaining the IR video data comprises capturing video data of the scene while the scene is illuminated by the plurality of IR illuminators.

9. The method of claim 1, further comprising identifying one or more motion entities in the IR video data; and
wherein colorizing the IR video data comprises:
colorizing the one or more motion entities using a first neural network;
and colorizing a background of the scene using a second neural network.

10. The method of claim 9, wherein colorizing the one or more motion entities comprises identifying potential color components for each of the one or more motion entities based on one or more prior images of motion entities.

11. The method of claim 9, further comprising classifying the one or more motion entities; and
wherein colorizing the one or more motion entities comprises, for each motion entity, identifying potential color components for the motion entity based on one or more prior images of motion entities that have a same classification as the motion entity.

12. The method of claim 1, wherein the camera does not include an IR filter for an image sensor; and
the method further comprises:
capturing one or more RGB color space images;
adjusting the captured images to remove an IR contribution; and
presenting the adjusted images to the user.

13. A computing system comprising:
one or more processors; and
memory coupled to the one or more processors, the memory storing instructions executable by the one or more processors to configure the computing system to:
obtain, via a video camera of the one or more video cameras, video data for a scene, wherein the video data comprises:
color video data in accordance with a determination that the scene has illumination above an illumination threshold; and
infrared (IR) video data in accordance with a determination that the scene does not have illumination above the illumination threshold;
colorize the IR video data based on a subset of the color video data, the colorization including converting an IR image of the infrared video data to a LAB color space image, identifying, via a neural network, a first set of potential A and B color components for the IR image, identifying a second set of potential A and B color components based on one or more prior images of the scene, and selecting A and B color components for the IR image based on the first set of potential A and B color components and the second set of potential A and B color components; and
present the colorized video data to a user in real time.

14. The computing system of claim 13, the instructions further executable to configure the computing system to:
train the neural network with a corpus composed of a plurality of IR images and a plurality of non-IR gray scale images.

15. The computing system of claim 13, the instructions further executable to configure the computing system to:
receive a lighting preference from a user of the system; and
select the one or more prior images of the scene based on the lighting preference.

16. The computing system of claim 13, wherein the one or more prior images of the scene comprise one or more RGB color space images previously captured by the camera.

17. The computing system of claim 13, wherein converting to the LAB color space image comprises utilizing one or more histogram equalization techniques to adjust an L luminance component for the IR image, wherein colorizing the IR video data comprises independently converting portions of the IR image, and wherein colorizing the IR video data comprises converting from a LAB color space image to an RGB color space image.

18. The computing system of claim 13, wherein the camera does not include an IR filter for an image sensor; and
the instructions further executable to configure the computing system to:
identify one or more motion entities in the IR video data; and
wherein the instructions to colorize the IR video data are executable to:
colorize the one or more motion entities using a first neural network; and
colorize a background of the scene using a second neural network.

19. The computing system of claim 13, wherein the camera includes a plurality of IR illuminators and an image sensor sensitive to IR light; and
wherein configuring the computing system to obtain the IR video data comprises capturing video data of the scene while the scene is illuminated by the plurality of IR illuminators.

20. The computing system of claim 13, the instructions further executable to configure the computing system to:
   identify one or more motion entities in the IR video data; and
   wherein the colorization of the IR video data configures the computing system to:
      colorize the one or more motion entities using a first neural network; and
      colorize a background of the scene using a second neural network.

* * * * *